US008612979B2

(12) United States Patent
Isaka

(10) Patent No.: US 8,612,979 B2
(45) Date of Patent: Dec. 17, 2013

(54) INFORMATION PROCESSING APPARATUS TO PROCESS A PROCESSING TARGET, INFORMATION METHOD, AND COMPUTER READABLE MEDIUM

(75) Inventor: Youichi Isaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 436 days.

(21) Appl. No.: 12/883,790

(22) Filed: Sep. 16, 2010

(65) Prior Publication Data

US 2011/0197199 A1    Aug. 11, 2011

(30) Foreign Application Priority Data

Feb. 5, 2010  (JP) .................................. 2010-024249

(51) Int. Cl.
 *G06F 9/46* (2006.01)
 *G06F 7/04* (2006.01)
 *G06F 3/12* (2006.01)
 *G06K 15/00* (2006.01)

(52) U.S. Cl.
 USPC ..... 718/100; 726/4; 726/5; 726/30; 358/1.13; 358/1.14; 358/1.15

(58) Field of Classification Search
 USPC ............... 358/1.11–1.18, 1.9; 718/1–105; 713/182–189; 726/26–30
 See application file for complete search history.

(56) References Cited

U.S. PATENT DOCUMENTS

| 6,865,354 | B2* | 3/2005 | Jackelen et al. ............... 399/81 |
| 2006/0028677 | A1* | 2/2006 | Isshiki et al. ................. 358/1.15 |
| 2006/0190604 | A1 | 8/2006 | Mizuno |
| 2006/0212819 | A1* | 9/2006 | Tobioka ........................ 715/764 |
| 2007/0094458 | A1 | 4/2007 | Suwabe |
| 2008/0144080 | A1* | 6/2008 | Randt ........................... 358/1.15 |
| 2008/0192289 | A1* | 8/2008 | Honda et al. .................. 358/1.15 |
| 2009/0268224 | A1* | 10/2009 | Takahashi ..................... 358/1.14 |

FOREIGN PATENT DOCUMENTS

| JP | 2006-048442 A | 2/2006 |
| JP | 2006-229614 A | 8/2006 |
| JP | 2007-122282 A | 5/2007 |

* cited by examiner

*Primary Examiner* — Abdullah Al Kawsar
(74) *Attorney, Agent, or Firm* — Sughrue Mion, PLLC

(57) ABSTRACT

An information processing apparatus includes: a reliability determination unit that determines reliability required for processing a processing target based on the processing target; a processing determination unit that makes a comparison between the reliability determined by the reliability determination unit and reliability of a processing main body and determines whether or not the processing main body can be caused to process the processing target; a processing target change unit that changes the processing target so as to change the reliability of the processing target if the processing determination unit determines that the processing main body cannot be caused to process the processing target; and a processing request unit that requests the processing main body to process the processing target changed by the processing target change unit.

5 Claims, 33 Drawing Sheets

FIG. 14

| DEFAULT WEB SERVICE URL | PROCESSING PARAMETER | COMPATIBLE WEB SERVICE URL | PROCESSING PARAMETER |
|---|---|---|---|
| http://123.45.78.1/service/ | skew=true | http://23.46.111.4/service/ | skew=true |
| | | http://22.33.44.55/skew/ | (NONE) |
| | | http://99.88.7.66/service2/ | method=skew |
| http://123.45.78.1/service3/ | rotate=90 | http://23.46.111.4/service/ | rot=90 |
| | | http://22.33.44.55/rotate/ | (NONE) |
| | | http://112.33.99.8/qr/ | process=rotate90 |

| SERVICE MENU | PROCESSING PARAMETER | SERVICE COOPERATION INFORMATION |
|---|---|---|
| ABC | XYZ | (http://123.045.078.001/service/, Skew=true), (http://123.045.078.001/service2/, Method=mozaic), (http://012.033.044.055/translate/, Lang=english, encode=UTF-8) |
| ⋮ | ⋮ | ⋮ |

INFORMATION PROCESSING APPARATUS TO PROCESS A PROCESSING TARGET, INFORMATION METHOD, AND COMPUTER READABLE MEDIUM

CROSS-REFERENCE TO RELATED APPLICATIONS

This application is based on and claims priority under 35 USC 119 from Japanese Patent Application No. 2010-024249 filed on Feb. 5, 2010.

BACKGROUND

Technical Field

This invention relates to an information processing apparatus, an information processing method and a computer readable medium.

SUMMARY

According to an aspect of the invention, an information processing apparatus includes: a reliability determination unit that determines reliability required for processing a processing target based on the processing target; a processing determination unit that makes a comparison between the reliability determined by the reliability determination unit and reliability of a processing main body and determines whether or not the processing main body can be caused to process the processing target; a processing target change unit that changes the processing target so as to change the reliability of the processing target if the processing determination unit determines that the processing main body cannot be caused to process the processing target; and a processing request unit that requests the processing main body to process the processing target changed by the processing target change unit.

BRIEF DESCRIPTION OF THE DRAWINGS

Exemplary embodiment(s) of the present invention will be described in detail based on the following figures, wherein:

FIG. 14 is a schematic representation to show a data structure example of a service compatibility table;

FIG. 15 is a schematic representation to show a data structure example of a service menu correspondence table;

DETAILED DESCRIPTION

Figure 1:
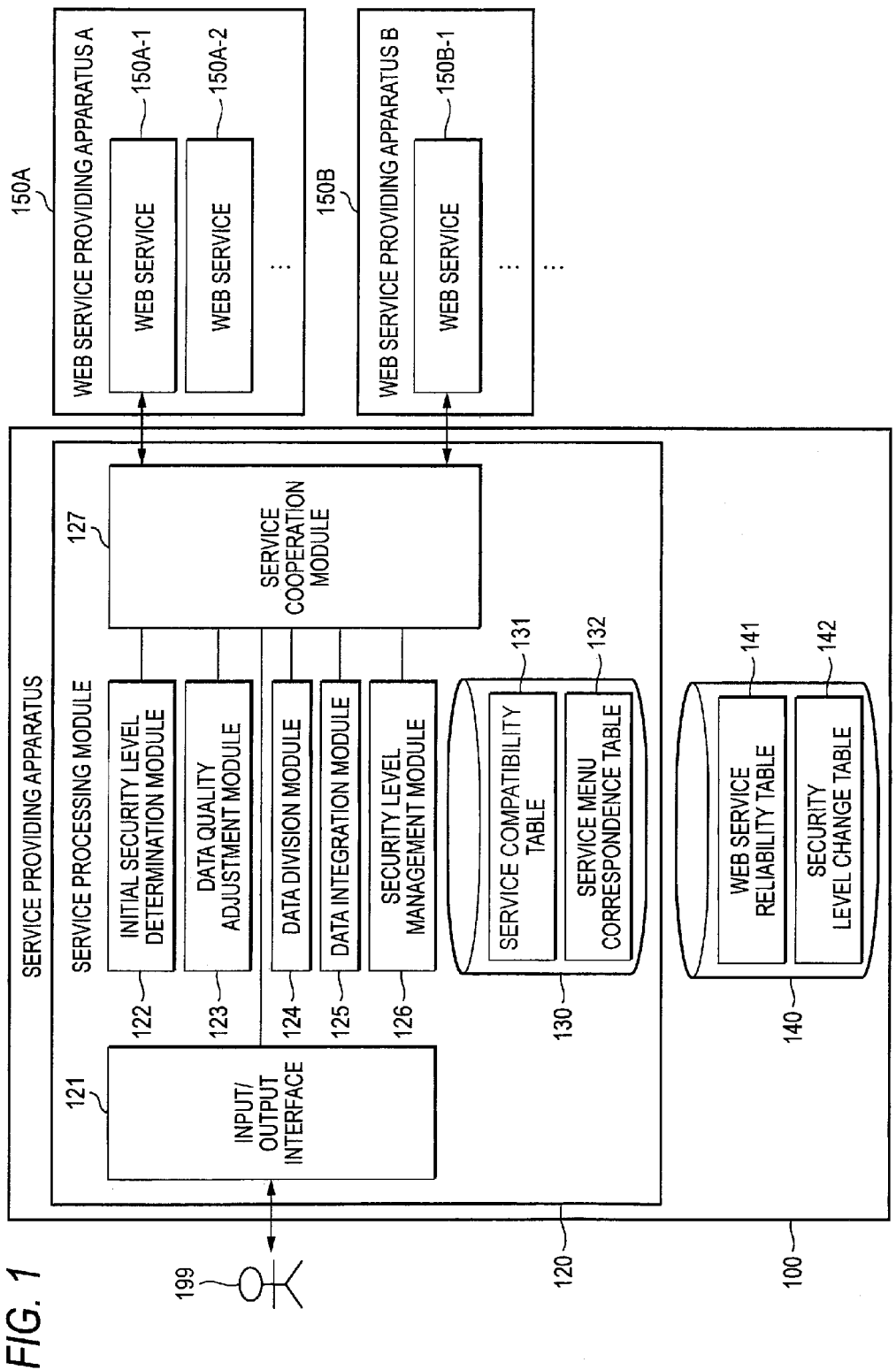
FIG. 1 is a conceptual module block diagram about a representative configuration example of exemplary embodiments of the invention.

Exemplary embodiments for realizing the invention will be discussed below based on the accompanying drawings:

FIG. 1 is a conceptual module block diagram about configuration examples of the exemplary embodiments.

A module refers to a generally and logically detachable component of software (computer program), hardware, etc. Therefore, the module in the exemplary embodiments means not only a module in a computer program, but also a module in the hardware configuration. Therefore, the exemplary embodiments also serve as the description of a computer program, a system, and a method for functioning as the modules. For the convenience of the description, "store" and its equivalent word are used, however, if the exemplary embodiment is a computer program, the words are used to mean storing in storage or controlling so as to store in storage. Modules may be in a one-to-one correspondence with functions; however, in implementation, one module may be one program or two or more modules may make up one program or two or more programs may make up one module. Two or more modules may be executed by one computer or one module may be executed in two or more computers in a distributed or parallel environment. One module may contain any other module. In the description to follow, the term "connection" is used to mean not only physical connection, but also logical connection (data transfer, command, reference relationship between data pieces, etc.,). The term "predetermined" refers to determined before target processing and is used to mean not only determined before start of processing according to exemplary embodiment, but also determined in response to the situation or the state at the time or the situation or the state so far if the time is before the target processing even if the time is after the processing according to exemplary embodiment is started.

The system or apparatus is not only provided by connecting a plurality of computers, hardware devices, units, etc., by communication means such as a network (containing peer-to-peer communication connection), etc., but also implemented as one computer, hardware device, apparatus, etc. The "apparatus" and the "system" are used as synonyms. The "system" does not contain a social "mechanism" of artificial arrangement, of course.

Target information is read from storage for each processing by each module or for each processing if a plurality of types of processing are performed in a module and after the processing is performed, the processing result is written to storage. Therefore, description of read from storage before processing and write to storage after processing may be omitted. The storage may contain hard disk, RAM (Random Access Memory), an external storage medium, storage through a communication line, a register in a CPU (Central Processing Unit), etc.

An information processing apparatus of the exemplary embodiment causes a Web service providing apparatus 150A, etc., to execute processing target in response to operation of a user 199. As shown in an example in FIG. 1, the information processing apparatus has a service providing apparatus 100, the Web service providing apparatus 150A, and a Web service providing apparatus 150B. The service providing apparatus 100 and the Web service providing apparatus 150A and the Web service providing apparatus 150B are connected by a communication line. In the example in FIG. 1, the two Web service providing apparatus 150 are illustrated, but the number of Web service providing apparatus may be three or more or may be one. In the exemplary embodiment, the processing main body refers to a computer, a program, etc., for processing the processing target. In the example in FIG. 1, Web service 150A-1, etc., applies. A plurality of processing main bodies may perform processing in cooperation (hereinafter also called cooperation processing). The cooperation mode may be sequential processing (for example, mode in which the processing result of one processing body is used as the processing target of any other processing and processing is performed in sequence) or may be parallel processing (for example, mode in which a plurality of processing main bodies perform the same processing target or different processing targets at the same time) or may be a combination thereof In the description to follow, sequential processing is mainly illustrated.

The service providing apparatus 100 has a service processing module 120, a reliability and security level relevant table storage module 140. It provides processing for the processing target in response to operation of the user 199. The service providing apparatus 100 mainly provides service (processing) of a plurality of Web services in cooperation with each other.

The service processing module 120 has an input/output interface 121, an initial security level determination module 122, a data quality adjustment module 123, a data division module 124, a data integration module 125, a security level management module 126, a service cooperation module 127, and a service relevant table storage module 130.

The input/output interface 121 is connected to the service cooperation module 127, accepts operation of the user, and passes the operation to the service cooperation module 127. It also performs output from the service cooperation module 127. For example, the input/output interface 121 contains hardware of a keyboard, a mouse, a display, a touch panel, etc., and controls them. The input/output interface 121, for example, may be provided by HTTP protocol and may be controlled through a Web browser, etc., via a communication line from an information processing terminal operated by the user 199.

The initial security level determination module 122 is connected to the service cooperation module 127 and determines reliability (hereinafter also called security level) required for processing a processing target based on the processing target. The initial security level determination module 122 passes the determined reliability to the service cooperation module 127.

The reliability required for processing the processing target is an evaluation value concerning the security that when the processing target is processed, the processing main body for performing the processing must include. The reliability required for the processing target is previously set for the processing target. The setting is determined according to a processing security level determination flow described later, for example. The reliability included by the processing main body is also previously set for the processing main body. The setting is made according to a Web service reliability table 1200 described later, for example.

For example, when the processing target is an image, if a text area or a face image is contained by object recognition, etc., the security level is set high. More specifically, the topic is described later with FIGS. 18, 19, and 20.

The initial security level determination module 122 may determine the reliability of each portion of the processing target divided by the data division module 124. The reliability is determined for each portion; if the whole processing target is high reliability, the reliability of a portion may be lower than that of the whole processing target and processing can also be performed for each portion.

The service cooperation module 127 is connected to the input/output interface 121, the initial security level determination module 122, the data quality adjustment module 123, the data division module 124, the data integration module 125, the security level management module 126, the Web service providing apparatus 150A, and the Web service providing apparatus 150B. If the security level management module 126 determines that the processing main body can perform processing the processing target, the service cooperation module 127 requests the Web service of the processing main body to perform processing of the processing target. For example, more specifically, Web service having reliability more than the reliability required by the processing target is used for perform processing. The service cooperation module 127 passes the reliability determined by the initial security level determination module 122 to the security level management module 126. The service cooperation module 127 accepts operation of the user 199 from the input/output interface 121 and passes the operation to the security level management module 126 as required. The service cooperation module 127 presents a service menu of the processing result and items, etc., to the display of the input/output interface 121. The service cooperation module 127 passes the processing target or a portion of the processing target to the data quality adjustment module 123, the data division module 124, and the data integration module 125 based on a command from the security level management module 126 and passes the processing result to the security level management module 126 or the Web service. For example, the service cooperation module 127 requests the Web service to perform processing for the processing target changed by the data quality adjustment module 123.

As Web service request processing, for example, specifically, the processing target and a processing parameter is transmitted and received to and from each Web service in accordance with the order of cooperation processing in accordance with service cooperation information. The service cooperation information is information required for performing cooperation processing and at least has information of the names and the order of Web services, required processing parameters, etc.

The security level management module 126 is connected to the service cooperation module 127, makes a comparison between the reliability determined by the initial security level determination module 122 and the reliability of the processing main body, and determines whether or not the processing main body can be caused to perform the processing target. The processing main body as the determination target may be one processing main body for performing next processing in cooperation processing or may be a plurality of processing main bodies for performing cooperation processing as one body.

When a plurality of processing main bodies perform a sequence of processing, before each processing main body performs processing, the security level management module 126 may determine whether or not the processing main body can be caused to perform the processing target. The determination is made before each processing main body performs processing. This means that the processing main body as the determination target is one processing main body for performing next processing in cooperation processing. Therefore, the number of determination times is as many as the number of processing main bodies in cooperation processing and determination and processing are repeated.

When a plurality of processing main bodies perform a sequence of processing, before the processing main bodies perform the sequence of processing, the security level management module 126 may determine whether or not the processing main bodies can be caused to perform the processing target. The determination is made before the sequence of processing is performed (before processing by the first processing main body in cooperation processing is performed) each processing main body performs processing. This means that the processing main bodies as the determination target are processing main bodies for performing cooperation processing as one body. Therefore, the number of determination times is only one and after determination is made, the sequence of processing is performed.

If the security level management module 126 determines that there is no processing main body that can process the processing target, the security level management module 126 may determine whether or not a processing main body stored in a service menu correspondence table 132 corresponding to the item selected based on operation of the user 199 is caused to process the processing target.

The security level management module 126 also holds the reliability of the processing target, changes the reliability of the processing target in response to the processing description according to a security level change table 142, etc.

The data quality adjustment module 123 is connected to the service cooperation module 127 and receives the processing target from the service cooperation module 127. If the security level management module 126 determines that the processing target cannot be processed, the data quality adjustment module 123 changes the processing target so as to change the reliability of the processing target. The data quality adjustment module 123 passes the processing result (changed processing target and reliability after the processing target is changed) to the service cooperation module 127. For example, a change is made in the direction of degrading the quality of the processing target. More specifically, if the processing target is an image, the resolution is set to low resolution (reduced) to degrade the image quality, noise is added, a color image is changed to a monochrome image, mosaic processing is performed, if the processing target contains an information image, the information image is erased, etc. The image information refers to a code created systematically to represent electronic data in a machine-readable mode; specifically, a one-dimensional bar code, a two-dimensional code, etc., exists. For example, as the two-dimensional code, QR code ((registered trademark), Quick Response code), etc., exists.

The data quality adjustment module 123 changes a portion of the processing target so as to change the reliability of the portion of the processing target divided by the data division module 124. A change is made in the direction of degrading the quality conforming to the type of processing target portion (for example, an image, text, a pattern, etc.,). A change is made for each portion and the portion may be deleted. If the portion is deleted, the reliability of the portion does not exist (equal to the lowest level).

The data division module 124 is connected to the service cooperation module 127 and divides the processing target. For example, for each type of processing target portion, the processing target is divided into portions. For example, if the processing target is a combination of an image, text, a pattern, etc., the processing target is divided for each type. If the processing target is an image document and has a structure, a structure analysis may be made and the processing target may be divided into portions. As the structure analysis, image processing is performed for the image portion in a document, the document is divided into portions of an image, text, a pattern, etc., and further the text portion is divided into a title, paragraphs, etc., and the pattern portion is divided into a table, a pattern, etc.

If processing is performed by the data division module 124, the initial security level determination module 122, the data quality adjustment module 123, the security level management module 126, and the service cooperation module 127 perform processing the portions into which the processing target is divided by the data division module 124 as the processing target.

If the security level management module 126 determines that processing cannot be performed, the data division module 124 may divide the processing target.

The data integration module 125 is connected to the service cooperation module 127 and integrates processed portion to form a processing target. It passes the integration result to the service cooperation module 127. That is, the data integration module 125 integrates the processing result after processing is performed by Web service for the portions into which the processing target is divided by the data division module 124 to form a processing target. In this case, if the security level management module 126 determines that processing cannot be performed, the service cooperation module 127 may cause the data division module 124 to divide the processing target into portions and may cause the Web service to process the portions into which the processing target is divided and the data integration module 125 may integrate them to form a processing target.

If the security level management module 126 determines that processing cannot be performed, the service cooperation module 127 may cause the data division module 124 to divide the processing target into portions and may cause the data quality adjustment module 123 to change the portions of the processing target so as to change the reliability for each of the portions into which the processing target is divided and degrade the reliability of the whole processing target until the processing target can be processed and then may cause the data integration module 125 to integrate them to form a processing target and may cause the Web service to process the processing target.

The service relevant table storage module 130 stores a service compatibility table 131 and the service menu correspondence table 132.

The service compatibility table 131 stores different processing main bodies corresponding to the processing main body. For example, it stores a combination of the processing main body and different processing main bodies required for performing equivalent processing to processing performed by the processing main body (also the case of one processing main body is also contained) in correspondence with each other. Specifically, a service compatibility table 1400 illustrated in FIG. 14 exists. FIG. 14 is a schematic representation to show a data structure example of the service compatibility table 1400. The service compatibility table 1400 has a default Web service URL column 1410, a processing parameter column 1420, a compatible Web service URL column 1430, and a processing parameter column 1440. That is, the service compatibility table 1400 stores a pair of a different Web service (compatible Web service URL column 1430) and a parameter (processing parameter column 1440) for performing processing equivalent to (compatible with) processing performed by a pair of Web service (default Web service URL column 1410) and a parameter required for the Web service to perform processing (processing parameter column 1420) in correspondence with each other. To perform equivalent processing in cooperation, more than one pair of the different Web service (compatible Web service URL column 1430) and the parameter (processing parameter column 1440) is used. For example, "http://123.45.78.1/service/" on the first row in the default Web service URL column 1410 has "Skew=true" in the processing parameter column 1420 as a parameter and as services for performing equivalent processing to the processing, "http://23.46.111.4/service/," "http://22.33.44.55/skew/," and "http://99.88.7.66/service2/" in the compatible Web service URL column 1430 perform processing in sequence. The parameters in the processing parameter column 1440 corresponds to each processing.

The default Web service URL column 1410 stores URL (Uniform Resource Locator) for providing standard Web service.

The processing parameter column 1420 stores a parameter required for the Web service to perform processing.

The compatible Web service URL column 1430 stores the URL of each Web service for performing equivalent processing to the Web service in the default Web service URL column 1410.

The processing parameter column 1440 stores parameters required for the Web services in the compatible Web service URL column 1430 to perform processing.

More than one pair of the compatible Web service URL column 1430 and the processing parameter column 1440 may exist for the pair of the default Web service URL column 1410 and the processing parameter column 1420. That is, if cooperation processing is required for performing processing equivalent to the Web service in the pair of the default Web service URL column 1410 and the processing parameter column 1420, the URLs and the parameters for providing a plurality of Web services are stored.

The security level management module 126, etc., searches the service compatibility table 1400 for the equivalent Web service pair as a value with the Web service as a key.

The service menu correspondence table 132 stores an item and a processing main body corresponding thereto. For example, it stores an item that can be selected by the user and the processing main body corresponding to the item (the number of processing main bodies may be one or may be a combination of processing main bodies for performing cooperation processing) in correspondence with each other. Specifically, a service menu correspondence table 1500 illustrated in FIG. 15 exists. FIG. 15 is a schematic representation to show a data structure example of the service menu correspondence table 1500.

The service menu correspondence table 1500 has a service menu column 1510, a processing parameter column 1520, and a service cooperation information column 1530. This means that the service menu correspondence table 1500 stores information required for indicating processing for the user 199.

The service menu column 1510 stores the name (item) of a service menu that the input/output interface 121 presents the user on the display, etc.

The processing parameter column 1520 stores a parameter required for providing the service.

The service cooperation information column 1530 stores Web services for providing service (the number of Web services may be one). Each URL for providing Web service and the parameter required for the processing are paired and in cooperation processing, the pairs are stored in the processing order.

The security level management module 126, etc., searches the service menu correspondence table 1500 for the Web service set for providing the service as a value with the service menu as a key.

The service providing apparatus 100 uses the service menu correspondence table 1500 for the user 199 of the end user and the service menu correspondence table 1500 is provided as an option and may be omitted.

The reliability and security level relevant table storage module 140 records a Web service reliability table 141 and a security level change table 142.

Figure 12:
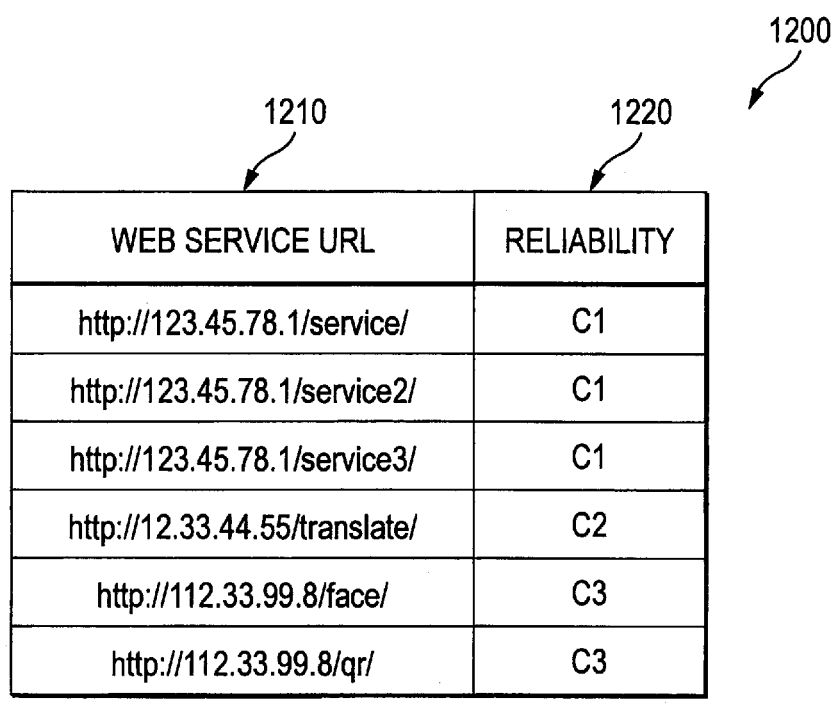
FIG. 12 is a schematic representation to show a data structure example of a Web service reliability table.

The Web service reliability table 141 is a correspondence table between the processing main body and security. Specifically, a Web service reliability table 1200 illustrated in FIG. 12 exists. FIG. 12 is a schematic representation to show a data structure example of the Web service reliability table 1200. The Web service reliability table 1200 has a Web service URL column 1210 and a reliability column 1220. This means that the Web service reliability table 1200 represents the correspondence between the URL of each Web service and the reliability of the Web service. The Web service reliability table 1200 represents the correspondence between the Web service and the security level that can be allowed as the processing service by the Web service. This means that the table indicates the processing target at the security level equal to or less than the reliability corresponding to the Web service.

The Web service URL column 1210 stores the URL for providing each Web service.

The reliability column 1220 stores the reliability of the Web service.

The security level management module 126, etc., searches the Web service reliability table 1200 for the reliability of the Web service as a value with the service menu as a key.

As the numeric value of the reliability (the digit following the letter C) is smaller, processing with higher reliability can be performed. As the numeric value of the security level (the digit following the letter S) is smaller, processing with higher reliability is required. For example, the Web service with reliability Si can apply to the processing target at higher security level than the Web service with reliability S3. For example, if the reliability of Web service is lower than the security level of the processing target, the reliability of Web service is insufficient and the Web service cannot process the processing target. If a positive value is added as the change degree of the security level, the security level is made higher; for example, if change degree 1 is added to the security level S3, the security level becomes S2. Conversely, if a negative value is added as the change degree of the security level, the security level is made lower; for example, if change degree –1 is added to the security level S3, the security level becomes S4.

The reliability of each Web service is previously determined using criteria as to whether or not the service is intra-company service, whether or not the service is de facto standard service, whether or not information security measures are taken, etc. For example, the administrator may previously determine the reliability or the reliability may be set according to whether or not the above-described condition is included. More specifically, the intra-service is set to higher reliability than extra-company service, the de facto standard service is set to higher reliability than other services, and if information security measures are taken, the service is set to higher reliability than the service for which information security measures are not taken.

The URL of Web service may be provided for each Web service or may be provided for each domain by assuming that the reliability degrees of Web services belonging to the domain are the same.

Figure 13:
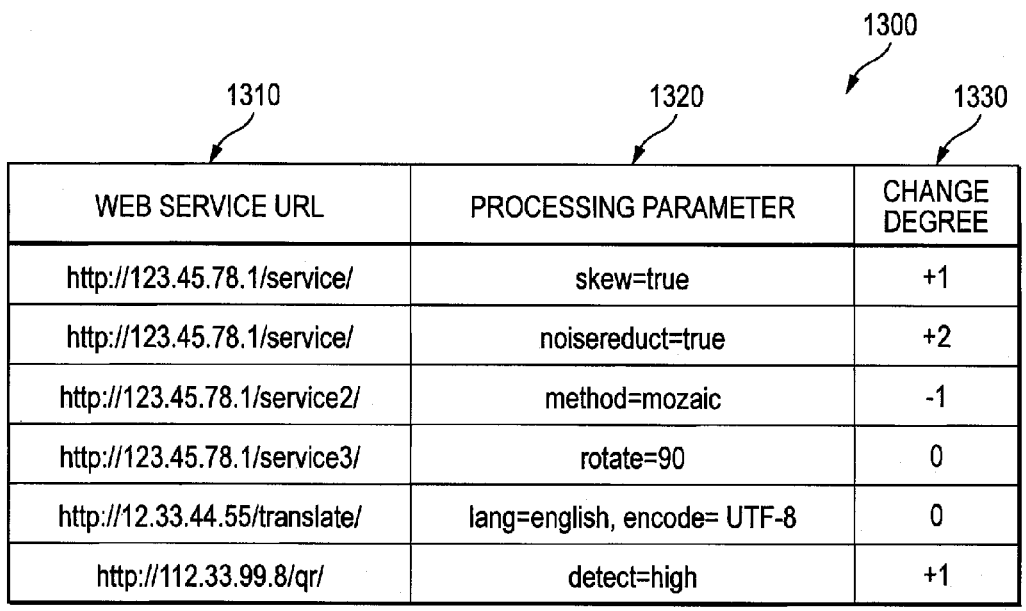
FIG. 13 is a schematic representation to show a data structure example of a security level change table.

The security level change table 142 is a table describing how the reliability required by the processing target is changed by performing one processing. Specifically, a security level change table 1300 illustrated in FIG. 13 exists. FIG. 13 is a schematic representation to show a data structure example of the security level change table 1300. The security level change table 1300 has a Web service URL column 1310, a processing parameter column 1320, and a change degree column 1330. That is, a combination of the URL of Web service and a given processing parameter is the processing description and the change degree of the security level according to each processing description, namely, how the security level of the processing target changes by the processing is indicated.

The Web service URL column 1310 stores the URL of each Web service.

The processing parameter column 1320 stores parameters given to the Web services in the Web service URL column 1310.

The change degree column 1330 stores each value for changing the security level of the processing target when each Web service in the Web service URL column 1310 performs processing with the parameter in the processing parameter column 1320.

For example, the change degree of skew correction processing of processing of improving the quality (service on the first row of the security level change table 1300) is "+ (plus)" and the change degree of mosaic processing of processing of degrading the quality (service on the third row of the security level change table 1300) is "– (minus)." For example, if the processing target is an image, the change degree is previously determined using criteria as to whether or not extraction of metadata and recognition of an image object are facilitated, etc. For example, the administrator may previously determine the change degree or the change degree may be set according to whether or not the above-described criteria are included. More specifically, if extraction of metadata, etc., is facilitated, the change degree is set to a plus high value.

In a system assuming no change of the security level for each processing according to each Web service (namely, the change degree is 0 in all Web services), the security level change table 1300 is not required.

The Web service providing apparatus 150 has Web services (150A-1, 150A-2, 150B-1, etc.,). For example, it is a program for performing service for performing actual processing provided by SOAP (Simple Object Access Protocol), REST (REpresentational State Transfer), etc., or is an information processing apparatus for executing the program.

Next, an outline of service processing examples when the exemplary embodiment is realized is shown using FIGS. 2 to 11.

The user 199 requests the service providing apparatus 100 to perform service processing in cooperation of services. It is assumed that the initial security level of a document 200 of the processing target is determined when processing is started. It is assumed that the "security level" described in the following description and processing flows is given to the processing target and the "reliability" is given to service.

The service providing apparatus 100 can perform processing using show-through removal service 150C with reliability Cl, skew correction service 150D with reliability C1, A company sky blue correction service 150E with reliability C2, and B company face recognition service 150F with reliability C3. The show-through removal service 150C and the skew correction service 150D are intra-company services and thus are set to high reliability. The A company sky blue correction service 150E and the B company face recognition service 150F are in other companies and thus are set to low reliability. The reliability of the Web services is set according to the Web service reliability table 141.

For example, if the security level of the document 200 of the processing target is S3, the reliability of each Web service is equal to or more than C3 (C3, C2, C1) and thus processing according to any Web service is also possible.

Figure 3:
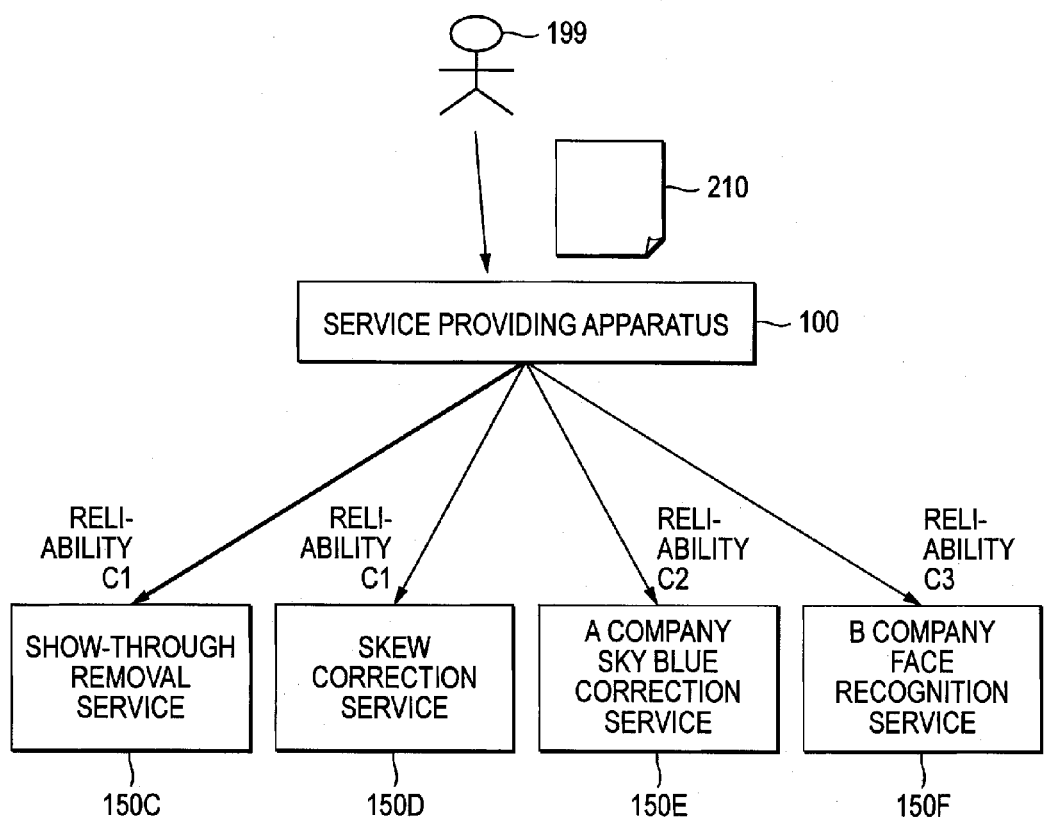
FIG. 3 is a schematic representation to show a service processing example when the exemplary embodiment of the invention is realized.

FIG. 3 shows that the security level of a document 210 of the processing result is made high because extraction of metadata and recognition of an image object of the document 200 are facilitated as a result of processing according to the show-through removal service 150C. For example, if the security level of the document 200 before processing is S3, the security level of the document 210 of the result of processing according to the show-through removal service 150C is changed to S2. The security level management module 126 performs this using the security level change table 142.

Figure 4:
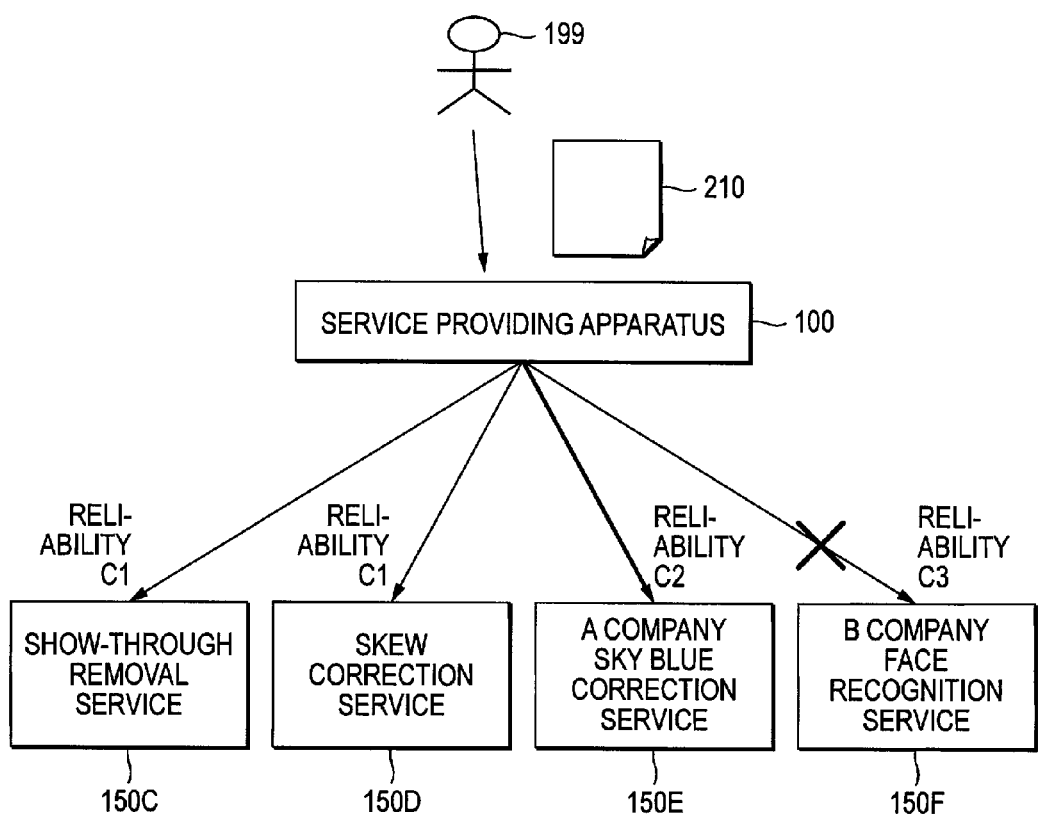
FIG. 4 is a schematic representation to show a service processing example when the exemplary embodiment of the invention is realized.

FIG. 4 shows that the document 210 whose security level is changed from S3 to S2 can use the show-through removal service 150C with reliability C1, the skew correction service 150D with reliability C1, and the A company sky blue correction service 150E with reliability C2, but is not allowed to use the B company face recognition service 150F because there is a problem on security. The security level management module 126 determines that the show-through removal service 150C, the skew correction service 150D, and the A company sky blue correction service 150E can be caused to process the document 210 and that the B company face recognition service 150F cannot be caused to process the document 210. The security level management module 126 performs the determination processing by making a comparison between the security level of the document 210 and the reliability of each Web service.

Figure 2:
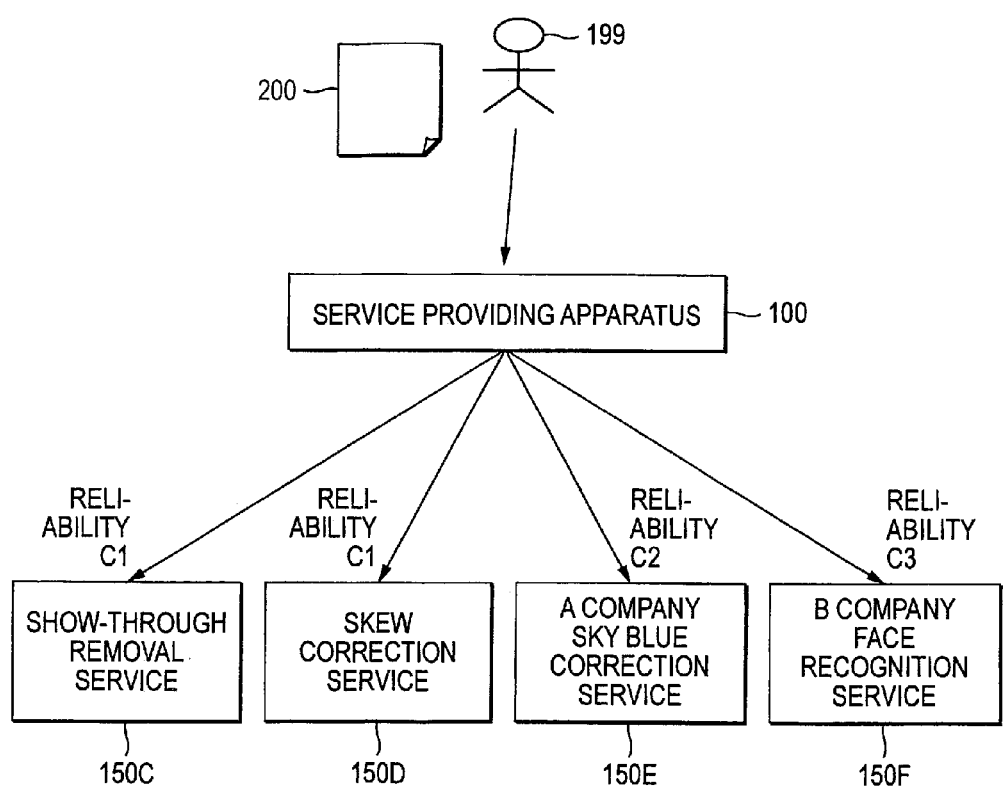
FIG. 2 is a schematic representation to show a service processing example when the exemplary embodiment of the invention is realized.
Figure 5:
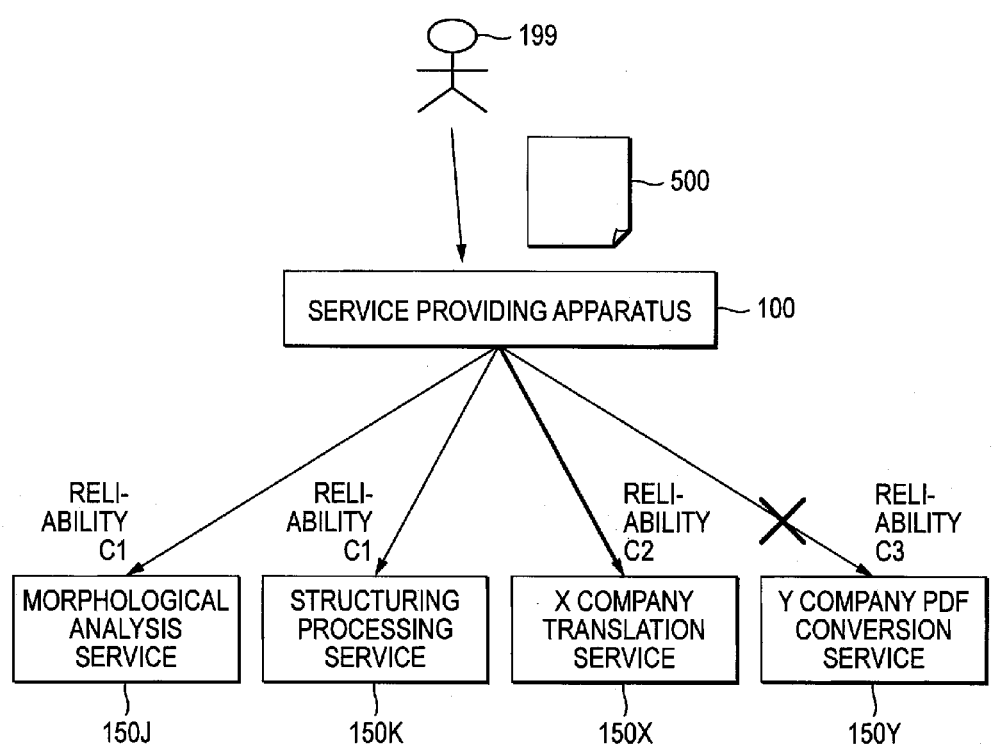
FIG. 5 is a schematic representation to show a service processing example when the exemplary embodiment of the invention is realized.

In the example in FIGS. 2 to 4, the example of the document is shown as the document of the processing target. FIG. 5 shows an example of handling text data as the processing target. As Web services, morphological analysis service 150J with reliability C1, structuring processing service 150K with reliability C1, X company translation service 150X with reliability C2, and Y company PDF conversion service 150Y with reliability C3 exist. The security level of a document 500 of the processing target is evaluated from the viewpoints of suiting for automatic processing and meaning because the document 500 is text data. The security level S2 higher than the reliability C3 of the Y company PDF conversion service 150Y is set for the document 500. Therefore, the security level management module 126 determines that the Y company PDF conversion service 150Y cannot be caused to process the document 500.

The security level of structured XML (eXtensible Markup Language) document, etc., is set higher than that of the document 500 of text data of a natural language for management.

The case where the security level management module 126 determines that Web services (the B company face recognition service 150F and the Y company PDF conversion service 150Y) cannot be caused to perform processing has been described. If the quality of the processing service lowers, the user may want to perform processing. Then, in the exemplary embodiment, processing shown in an example in FIGS. 6 to 11 is performed.

Figure 6:
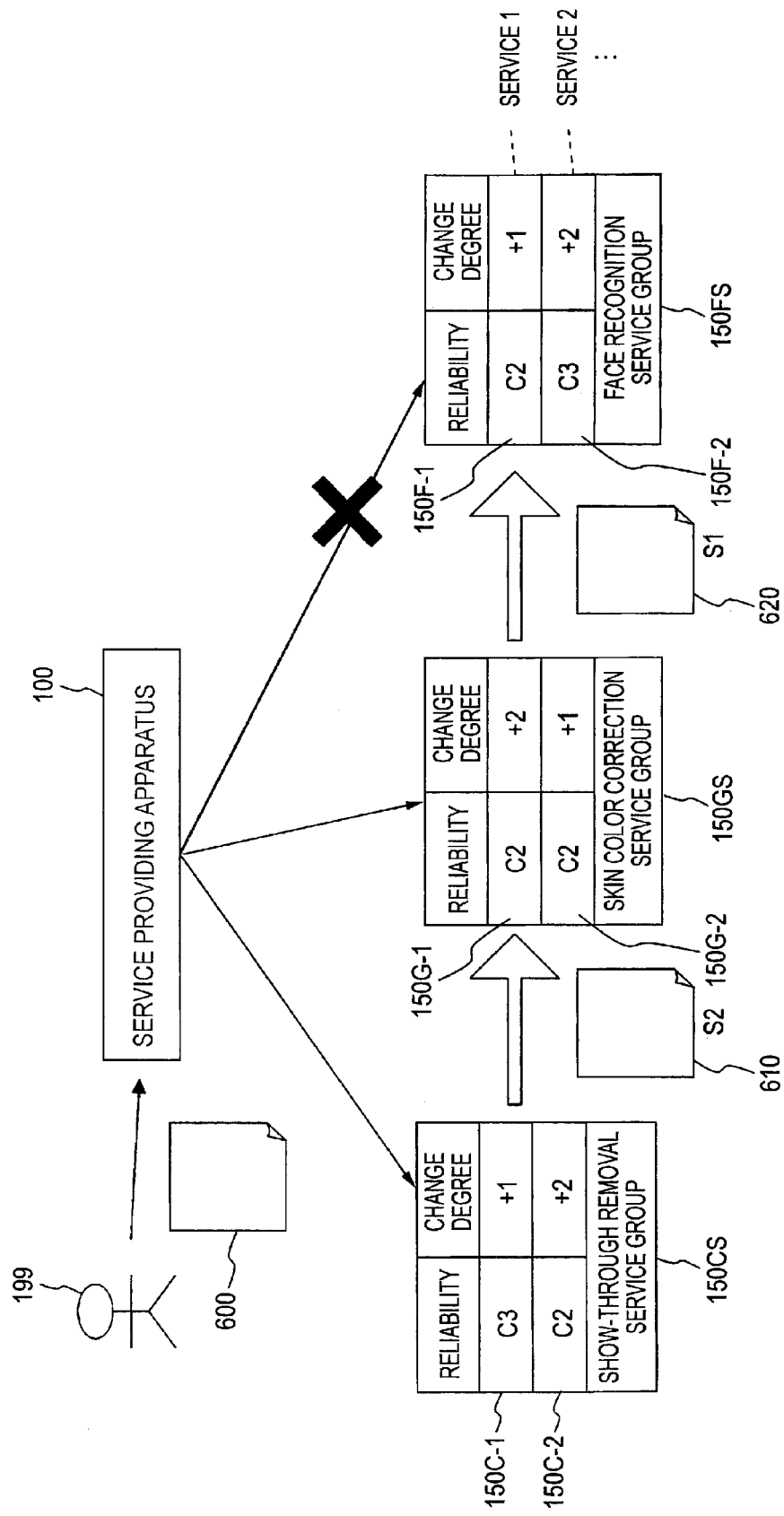
FIG. 6 is a schematic representation to show an example wherein service processing cannot be continued midway if an alternate service is used.

FIG. 6 is a schematic representation to show an example wherein service processing cannot be continued midway if an alternate service is used. As cooperation processing, three types of processing of the show-through removal service 150C, skin color correction service 150G, and the face recognition service 150F are performed in order. In the exemplary embodiment, alternate service can be selected using the service compatibility table 131. Show-through removal service group 150CS, etc., shown in the example in FIG. 6 is a simple table provided by joining the service compatibility table 1400 and the security level change table 1300. That is, in the show-through removal service group 150CS, either show-through removal service 150C-1 with reliability C3 or show-through removal service 150C-2 with reliability C2 can be selected. If processing is performed according to the show-through removal service 150C-1, the change degree of security level is "+1" and if processing is performed according to the show-through removal service 150C-2, the change degree of security level is "+2."

Here, it is assumed that the security level management module 126 adopts services with low change degree for cooperation processing. In the example in FIG. 6, the show-through removal service 150C-1 is selected in the show-through removal service group 150CS, skin color correction service 150G-2 is selected in skin color correction service group 150GS, face recognition service 150E-1 is selected in face recognition service group 150FS. For example, assuming that the security level of a document 600 before processing is S3, the document becomes a document 610 whose security level is S2 by performing processing according to the show-through removal service 150C-1 and next the document becomes a document 620 whose security level is S1 by performing processing according to the skin color correction service 150G-2. The security level management module 126 determines that the show-through removal service 150C-1 can be caused to process the document 600 and determines that the skin color correction service 150G-2 can be caused to process the document 610.

Next, service must be selected out of the face recognition service group 150FS, but service whose reliability is equal to or more than C1 does not exist. Therefore, the security level management module 126 determines that the face recognition service 150E-1 (or the face recognition service 150E-2) cannot be caused to process the document 620.

Figure 7:
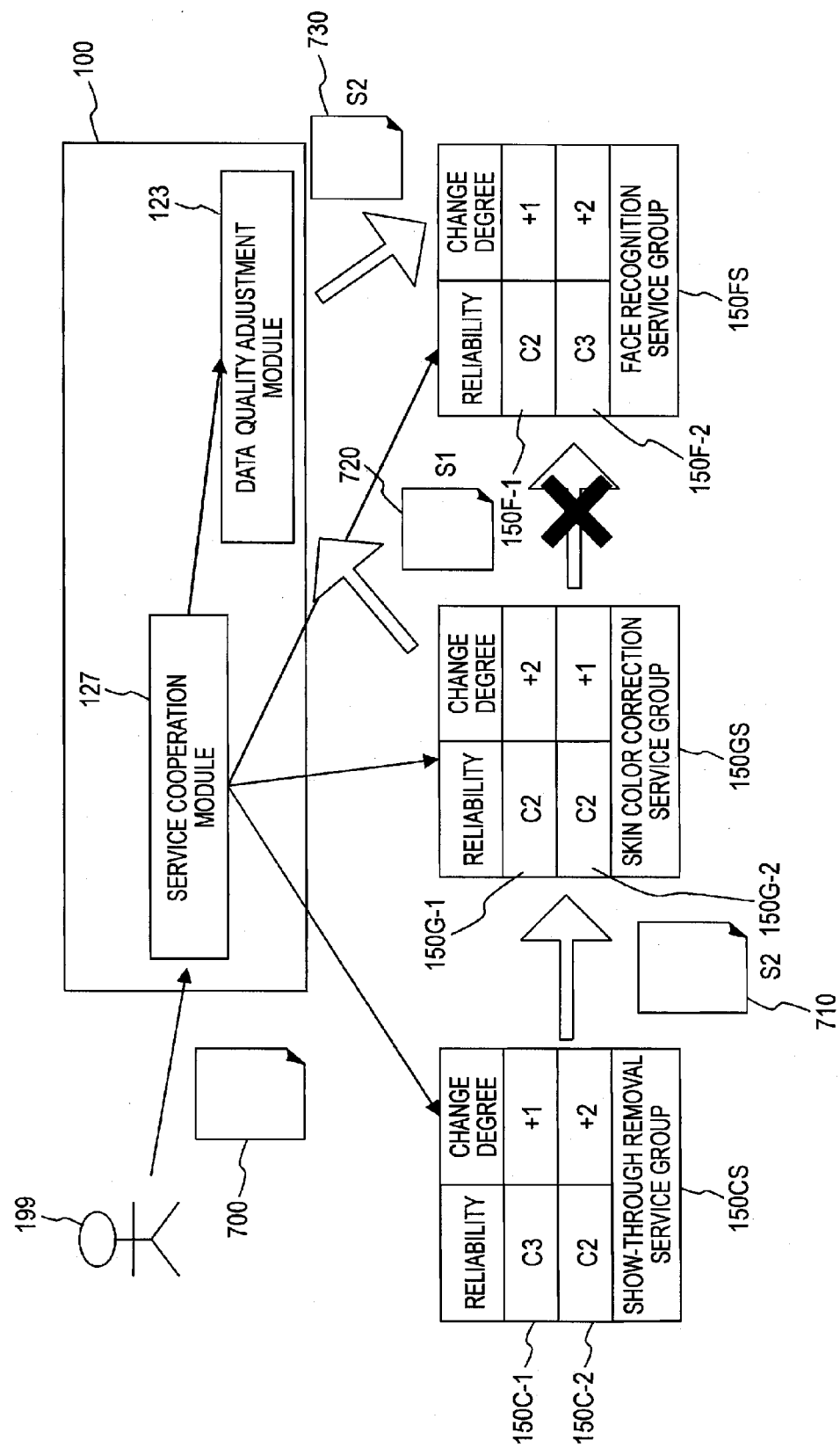
FIG. 7 is a schematic representation to show a service processing example when the exemplary embodiment of the invention is realized.

Then, in a first exemplary embodiment, processing as shown in an example in FIG. 7 is performed. That is, in the first exemplary embodiment, cooperation processing is performed and in processing in which service satisfying the reliability that can be processed is not found, the data quality adjustment module 123 performs processing of lowering the security level of the processing target data to the level at which the processing can be executed. FIG. 7 is a schematic representation to show a service processing example when the exemplary embodiment is realized. Processing to the skin color correction service 150G-2 in FIG. 7 is equal to the processing to the skin color correction service 150G-2 in FIG. 6. However, to clarify distinction between the processing targets, the reference numeral of the document is document 700 rather than document 600. The security level of a document 720 is S1.

If the security level management module 126 determines that the face recognition service 150E-1 cannot be caused to process the document 720, the data quality adjustment module 123 changes the document 720 so as to lower the security level of the document 720 (namely, lower the quality of the document 720) to generate a document 730 with security level S2. For example, processing of noise addition, etc., is performed. Accordingly, the security level management module 126 determines that the face recognition service 150E-1 can be caused to process the document 730.

Figure 8:
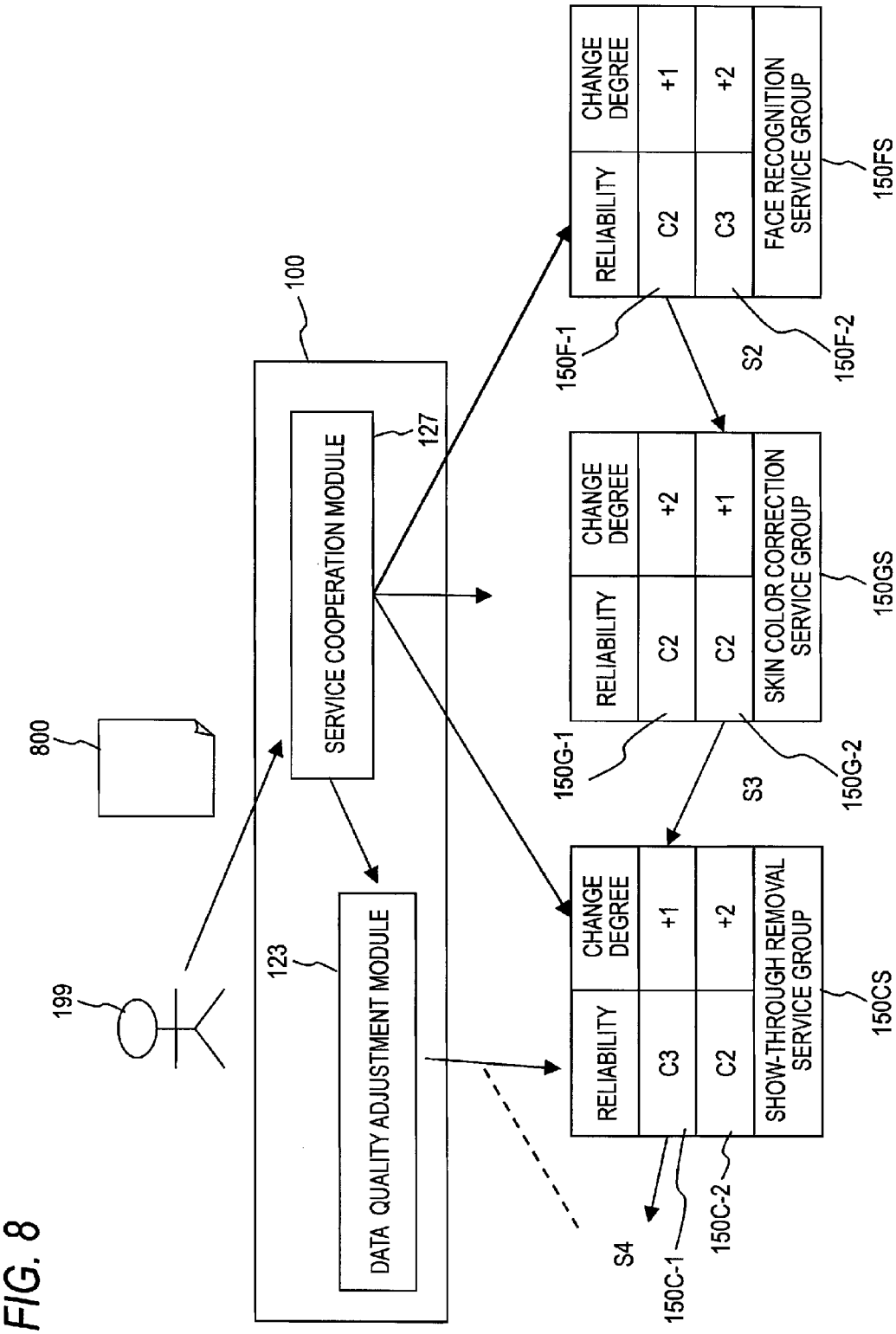
FIG. 8 is a schematic representation to show a service processing example when the exemplary embodiment of the invention is realized.

In a second exemplary embodiment, processing as shown in an example in FIG. 8 is performed. That is, in the second exemplary embodiment, the initial security level at which whole processing according to cooperation processing is possible is found and the data quality adjustment module 123 adjusts the processing target to the quality corresponding to the found initial security level. FIG. 8 is a schematic representation to show a service processing example when the exemplary embodiment is realized. Cooperation processing is equal to that illustrated in FIG. 6. However, to clarify distinction between the processing targets, the reference numeral of the document is document 800 rather than document 600. The security level of the document 800 is S3.

For example, the following processing is performed:
(1) The reference security level is found from the highest reliability in services of the last processing. In the example in FIG. 8, the highest reliability in the face recognition service group 150FS is C2 (the face recognition service 150E-1) and thus the reference security level is set to S2.
(2) For example, in service of processing at the preceding stage, a comparison is made between the value resulting from subtracting the lowest change degree from the reference security level and the security level corresponding to the reliability of the target service and update is executed based on the low value. In the example in FIG. 8, in the face recognition service group 150FS at the preceding stage, a comparison is made between the value (S3) resulting from subtracting the lowest change degree (+1) from the reference security level (S2) and the security level corresponding to the reliability (the reliability of the skin color correction service 150G-2 is C2 and thus the security level corresponding thereto is S2) and update is executed based on the low value (S3). Details are described later with examples in FIGS. 9 and 10.
(3) (2) described above is repeated up to the top processing and the finally obtained security level is the initial security level at which processing can be continued. In the example in FIG. 8, in the show-through removal service group 150CS at the preceding stage, a comparison is made between the value (S4) resulting from subtracting the lowest change degree (+1) from the reference security level (S3) and the security level corresponding to the reliability (the reliability of the show-through removal service 150C-1 is C3 and thus the security level corresponding thereto is S3) and update is executed based on the low value (S4). Since the show-through removal service group 150CS is the top processing, the finally obtained security level (S4) is the initial security level at which processing can be continued.
(4) The data quality adjustment module 123 adjusts the processing target to the quality corresponding to the initial security level found in (3) described above. In the example in FIG. 8, the data quality adjustment module 123 changes the document 800 (security level S3) so as to become the initial security level S4.
(5) Cooperation processing is performed.

Figure 9:
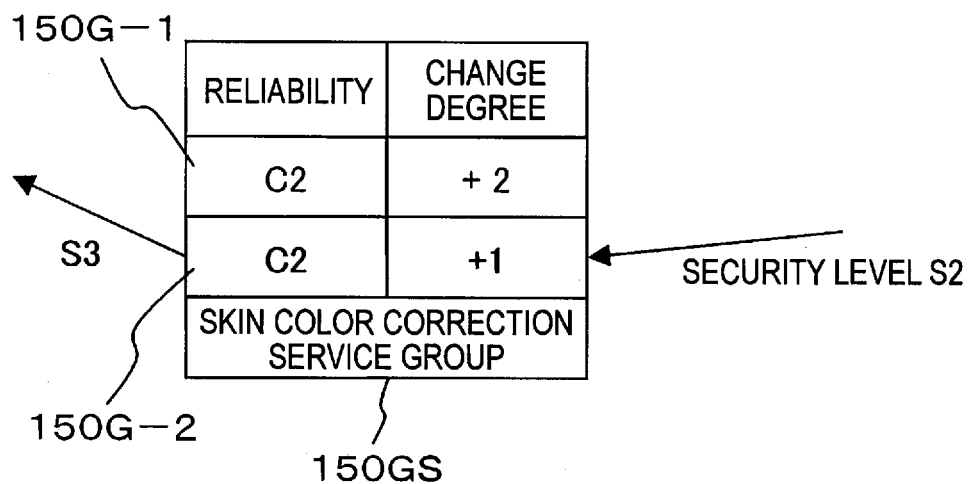
FIG. 9 is a schematic representation to show an example of applying the subtraction value of the change degree.

The case where the subtraction value of the change degree is applied in (2) described above will be discussed. FIG. 9 is a schematic representation to show an example of applying the subtraction value of the change degree.

The processing at the preceding stage is the skin color correction service group 150GS and the security level of the processing target before processing by the skin color correction service group 150GS is found.

For example, when the reference security level accepted by processing at the following stage is S2, if the skin color correction service 150G-2 with the lowest change degree in the skin color correction service group 150GS is selected and a comparison is made between the value S3 (S2-1) resulting from subtracting the change degree (+1) and the security level S2 corresponding to the reliability C2 of the skin color correction service 150G-2, the subtraction value (S3) is lower and thus is adopted as the reference security level.

Figure 10:
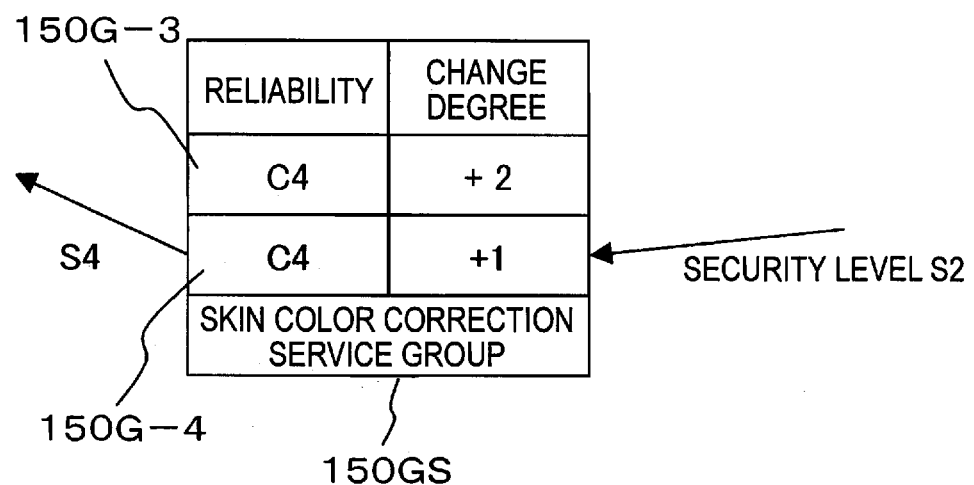
FIG. 10 is a schematic representation to show an example of applying the reliability correspondence level.

The case where the reliability correspondence level is applied in (2) described above will be discussed. FIG. 10 is a schematic representation to show an example of applying the reliability correspondence level. As with the case in FIG. 9, the processing at the preceding stage is the skin color correction service group 150GS and the security level of the processing target before processing by the skin color correction service group 150GS is found. However, reliability differs.

For example, when the reference security level accepted by processing at the following stage is S2, if the skin color correction service 150G-4 with the lowest change degree in the skin color correction service group 150GS is selected and a comparison is made between the value S3 (S2-1) resulting from subtracting the change degree (+1) and the security level S4 corresponding to the reliability C4 of the skin color correction service 150G-4, the security level (S4) corresponding to the reliability is lower and thus is adopted as the reference security level. This means that the skin color correction service 150G-4 with reliability C4 cannot process processing target at the security level of the subtraction value (S3).

Figure 11:
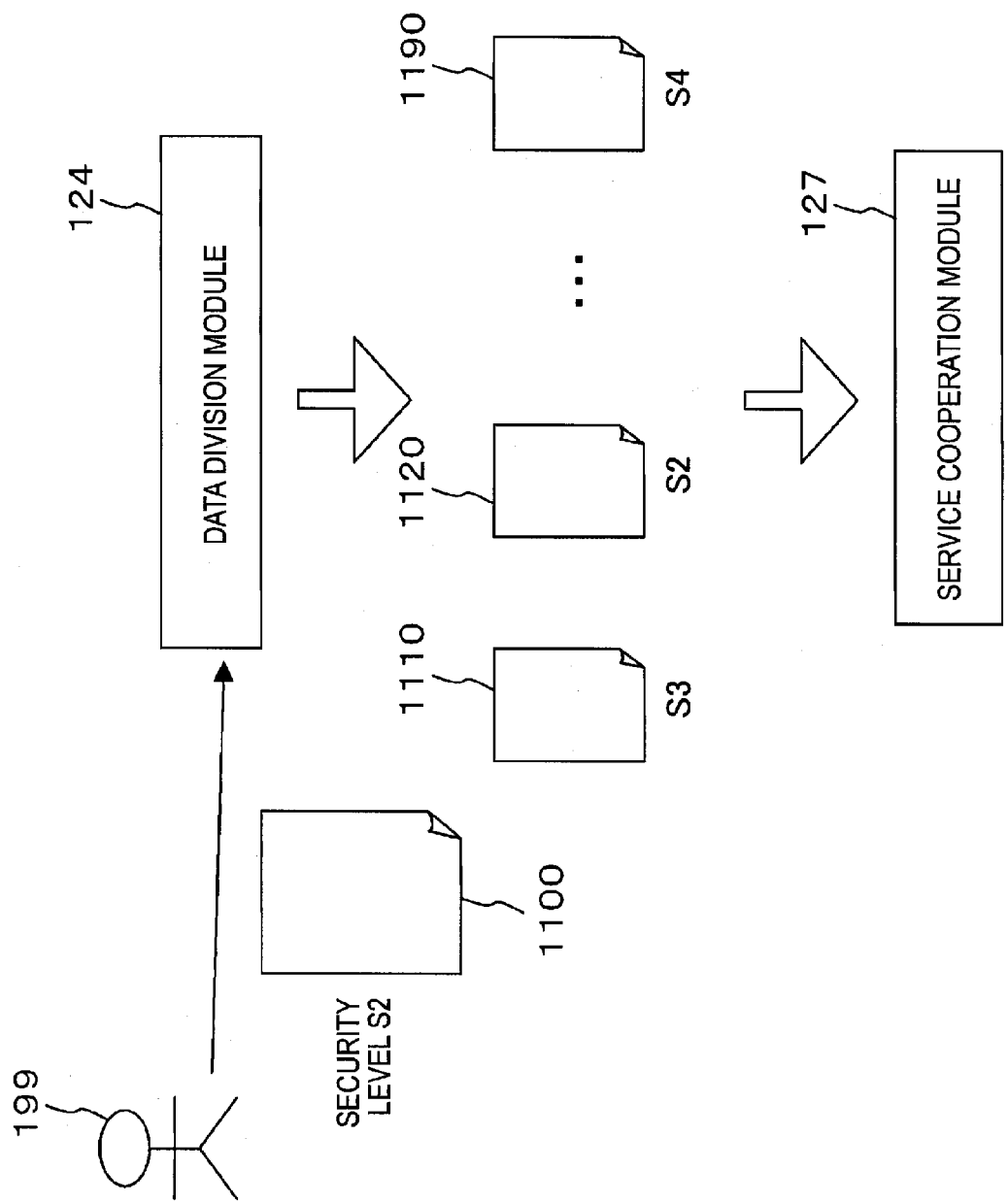
FIG. 11 is a schematic representation to show a service processing example when the exemplary embodiment of the invention is realized.

In third and fourth exemplary embodiments, processing as shown in an example in FIG. 11 is performed. FIG. 11 is a schematic representation to show a service processing example when the exemplary embodiment is realized. They are executed in combination with the first exemplary embodiment or the second exemplary embodiment. This means that processing by the data division module 124, the data integration module 125 is added.

The processing target is divided into parts and processing is performed for each division data at a lower security level than the original security level. For example, if the processing target is a curriculum vitae, it is divided into a face photo, a part of personal information, etc. It is general that the security level of each division data piece is lower than that of complete information data (namely, original processing target). The target whose quality is to be degraded can be limited to a portion at a high security level.

For example, in FIG. 11, the data division module 124 divides a document 1100. In the example, the data division module 124 divides the document 1100 into a division document 1110, a division document 1120, a division document 1190, etc. Although the security level of the document 1100 is S2, the security level of the division document 1110 becomes S3, that of the division document 1120 becomes S2, and that of the division document 1190 becomes S4.

Then, the service cooperation module 127 performs cooperation processing for each division document 1110, etc. After each processing terminates or after the cooperation processing terminates, the data integration module 125 integrates the processing results of portions to generate the final processing result. The data quality adjustment module 123 may change portions of the processing target so as to change the reliability of the portions of the processing target divided by the data division module 124. Processing of the data quality adjustment module 123, etc., is equal to that of the first or second exemplary embodiment. If the security level management module 126 determines that processing for the document 1100 cannot be performed, the data division module 124 may perform division processing.

The processing outline of the first to fourth exemplary embodiments has been described. Next, specific processing examples of the exemplary embodiments will be discussed.
<First exemplary embodiment>

Figure 16:
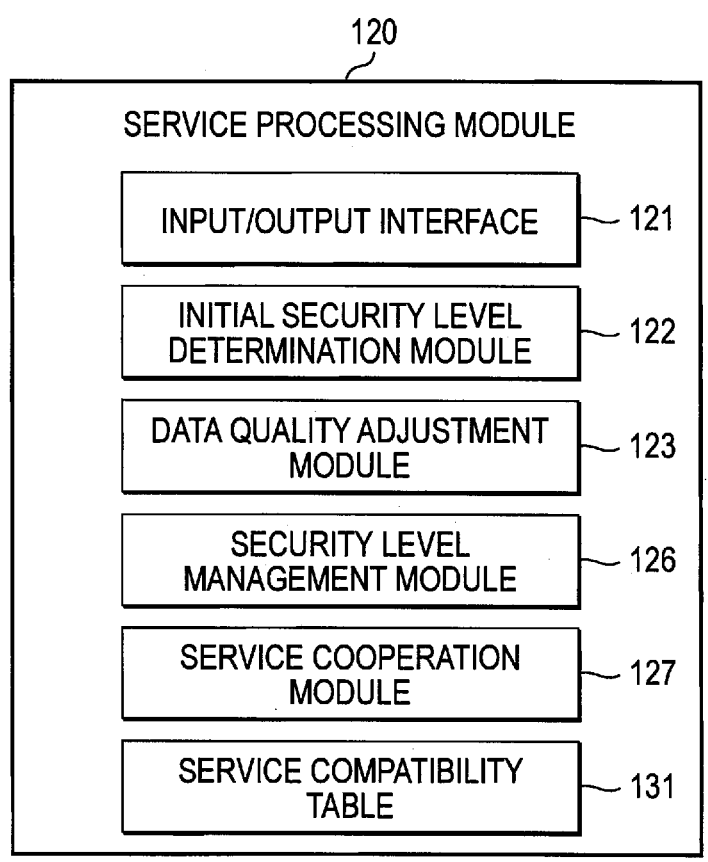
FIG. 16 is a conceptual module block diagram about a main configuration example of a first exemplary embodiment of the invention.

FIG. 16 is a conceptual module block diagram about a main configuration example of the first exemplary embodiment of the invention. A service processing module 120 in the first exemplary embodiment has an input/output interface 121, an initial security level determination module 122, a data quality adjustment module 123, a security level management module 126, a service cooperation module 127, and a service compatibility table 131.

Service cooperation information (order and combination of used Web services and parameter specified for each Web service) is specified from other than a service providing apparatus 100. Before processing according to each Web service is performed, whether or not the Web service is Web service with reliability not satisfying the security level if compatible Web service is used is determined. If the Web service does not satisfy the security level, the quality of the processing target is lowered to lower the security level of the processing target.

Figure 17:
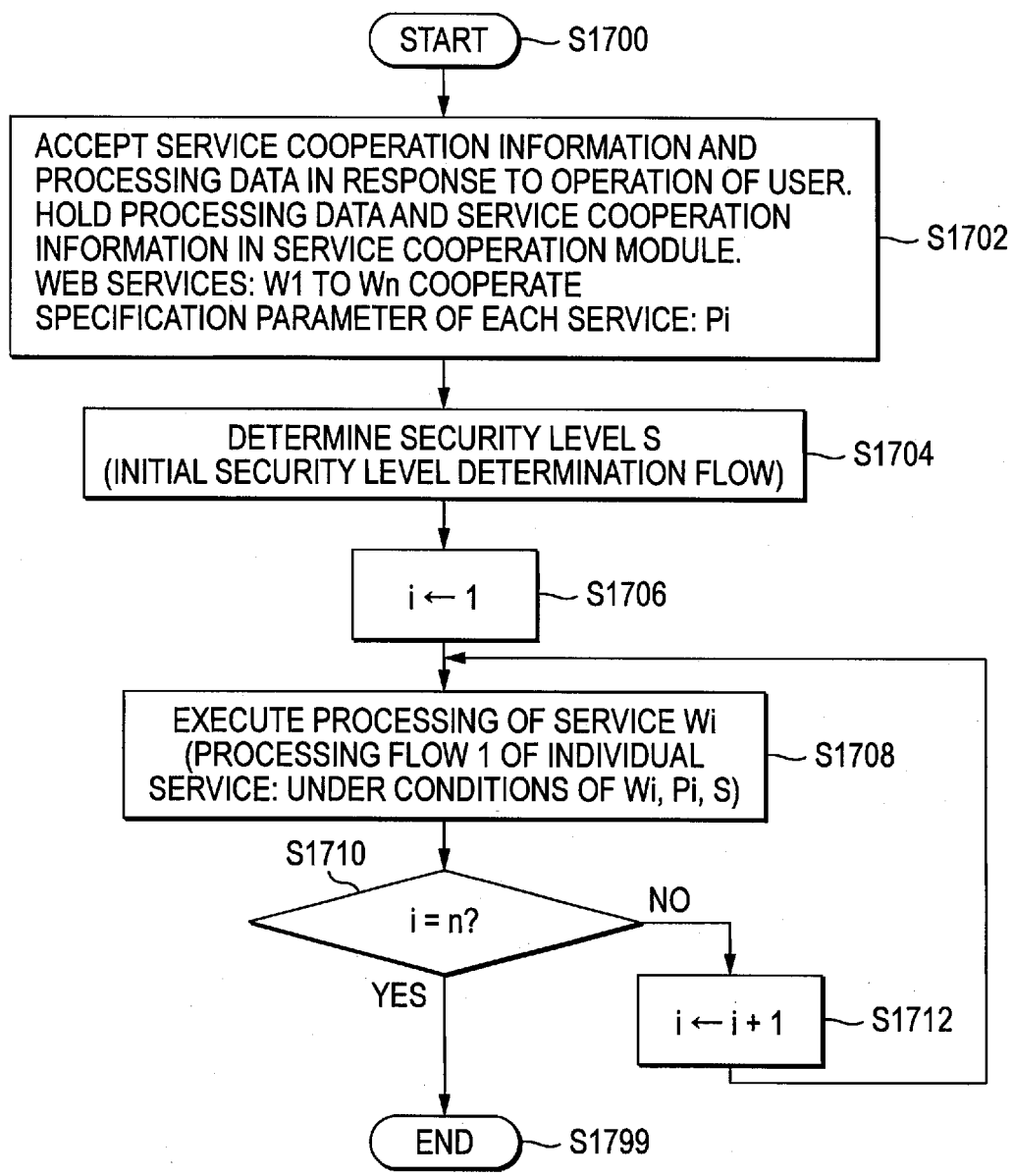
FIG. 17 is a flowchart to show a service processing example according to the first exemplary embodiment of the invention.

FIG. 17 is a flowchart to show a service processing example according to the first exemplary embodiment of the invention. In the processing example, while processing is actually performed, if service with reliability satisfying the security level does not exist, the data quality adjustment module 123 performs processing of lowering the security level.

At step S1702, the service cooperation module 127 accepts service cooperation information and the processing target (hereinafter the processing target is also called processing data) in response to operation of the user. The processing data and the service cooperation information are held in the service cooperation module 127. Web services W1 to Wn (nth Web service is described as Wn) are caused to operate and the specification parameter of each service is Pi.

Figure 18:
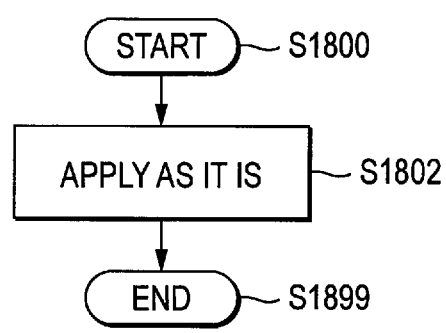
FIG. 18 is a flowchart to show a first determination processing example of the initial security level.
Figure 19:
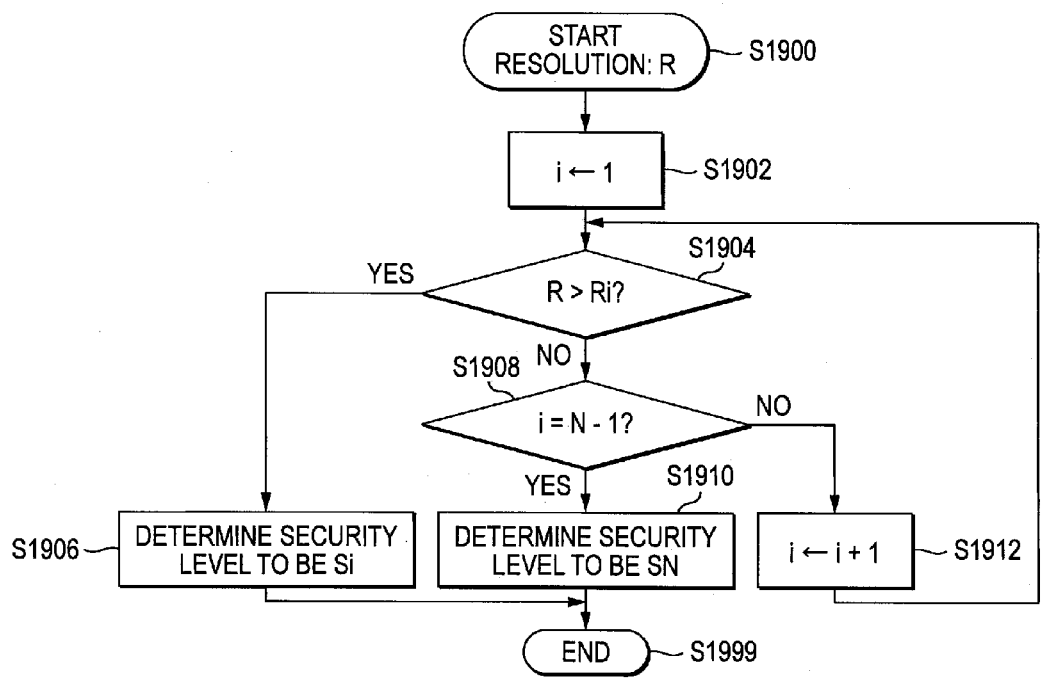
FIG. 19 is a flowchart to show a second determination processing example of the initial security level.
Figure 20:
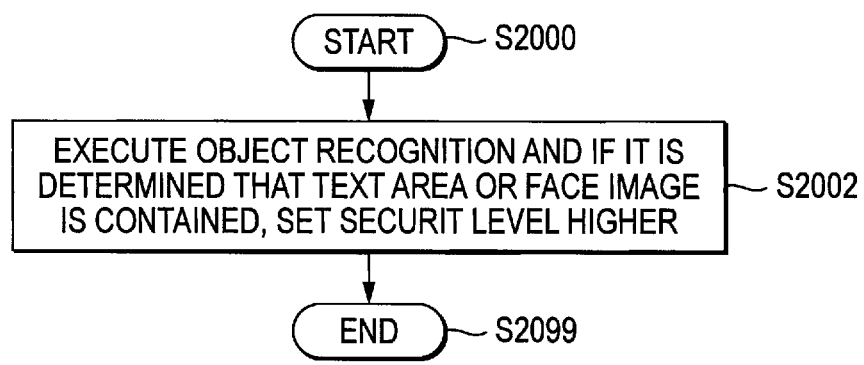
FIG. 20 is a flowchart to show a third determination processing example of the initial security level.

At step S1704, the initial security level determination module 122 determines the security level to be S. Any of initial security level determination flows illustrated in FIGS. 18 to 20 is used. This topic is described later.

At step S1706, the service cooperation module 127 assigns 1 to a variable i.

Figure 21:
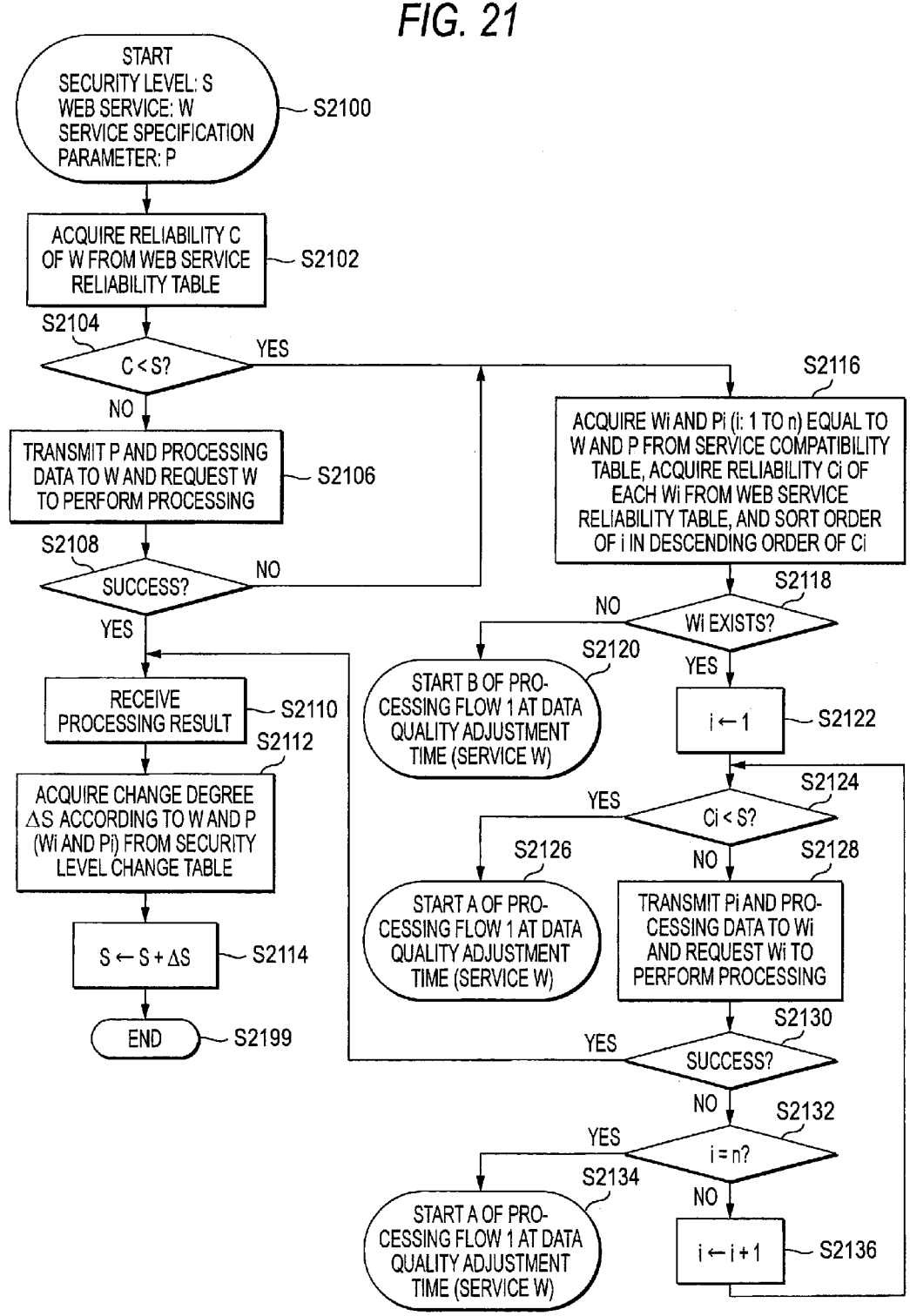
FIG. 21 is a flowchart to show processing example (1) of individual service.

At step S1708, the service cooperation module 127 causes service Wi to execute processing. Processing flow 1 of individual service illustrated in FIG. 21 is used. This topic is described later. Processing flow 1 is used under the conditions of Wi, Pi, and S.

Figure 23:
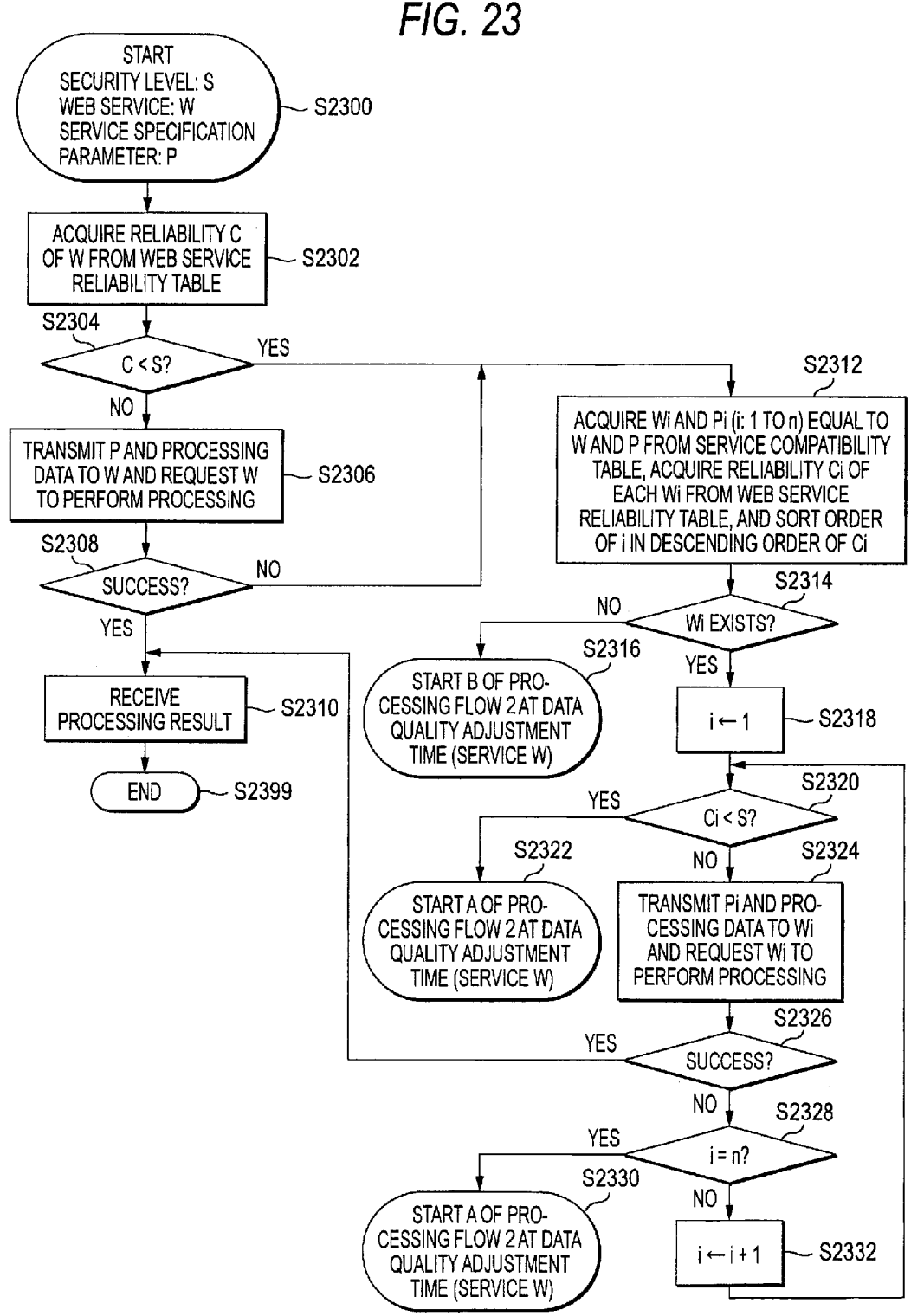
FIG. 23 is a flowchart to show processing example (2) of individual service.

In a system in which the security level does not vary for each processing according to each Web service, at step S 1708, processing flow 2 of individual service illustrated in FIG. 23 is used in place of processing flow 1 of individual service.

At step S1710, the service cooperation module 127 determines whether or not i=n. If i=n, the processing is terminated (step S 1799); otherwise, the process goes to step S1712.

At step S1712, the service cooperation module 127 assigns i+1 to a variable i and returns to step S1708.

Flowcharts illustrated in FIGS. 18 to 20 are processing at step S1704 in the flowchart illustrated in FIG. 17. The initial security level determination module 122 performs the processing and the security level management module 126 stores the security level determined at the termination time.

FIG. 18 is a flowchart to show a first determination processing example of the initial security level. This is processing when the security level is given to the processing data. That is, the security level is contained in the processing data as attribute, etc. For example, the security level of the processing data specified by the user 199 together with the processing data may be received.

At step S1802, the initial security level determination module 122 extracts the security level given to the processing data and applies it as it is.

FIG. 19 is a flowchart to show a second determination processing example of the initial security level. This is processing when the processing data is an image.

At step S1900, the resolution of the processing data is extracted and is set to R. At security level Si (i: 1 to N) of N levels, the threshold value of the resolution assigned to each security level is Ri (i: 1 to N−1). As the relationship between Ri and Si, the higher the resolution, the higher the security level.

At step S1902, 1 is assigned to the variable i.

At step S1904, whether or not R>Ri is determined. If R>Ri, the process goes to step S1906; otherwise, the process goes to step S1908.

At step S1906, the security level of the processing data is determined to be Si. Then, the processing terminates (step S1999).

At step S1908, whether or not the variable i is equal to N−1 is determined. If they equal, the process goes to step S1910; otherwise, the process goes to step S1912.

At step S1910, the security level is determined to be SN. Then, the processing terminates (step S1999).

At step S1912, i+1 is assigned to the variable i. The process returns to step S1904.

FIG. 20 is a flowchart to show a third determination processing example of the initial security level. This is processing when the processing data is an image.

At step S2002, object recognition is performed for an image (the type of object contained in the image (text area, pattern area, photo area, etc.,) and if a text area or a face image is contained, the security level is set higher than the case where it is not contained.

FIG. 21 is a flowchart to show processing example (1) of individual service.

At step S2100, security level is set to S, Web service is set to W, and service specification parameter is set to P and then the processing is started.

At step S2102, the security level management module 126 acquires reliability C of Web service W from a Web service reliability table 141.

At step S2104, the security level management module 126 makes a comparison between the reliability C of the Web service W and security level S of processing data and whether or not C<S (the processing data cannot be processed in the Web service) is determined. If C<S, the process goes to step S2116; otherwise, the process goes to step S2106.

At step S2106, the service cooperation module 127 transmits P and the processing data to the Web service W and requests the Web service W to perform processing.

At step S2108, the service cooperation module 127 determines whether or not the processing at step S2106 ends in success. If the processing ends in success, the process goes to step S2110; otherwise, the process goes to the step S2116.

At step S2110, the service cooperation module 127 receives the processing result.

At step S2112, the security level management module 126 acquires change degree ΔS (corresponding change degree column 1330 in security level change table 1300) according to W and P (Wi and Pi, namely, a pair of Web service URL column 1310 and processing parameter column 1320 in the security level change table 1300) from a security level change table 142.

At step S2114, the security level management module 126 assigns S+ΔS to a variable S and terminates the processing (step S2199).

At step S2116, the security level management module 126 acquires Wi and Pi (i: 1 to n) equal to W and P from the service compatibility table 131, acquires reliability Ci of each Wi from the Web service reliability table 141, and sorts the order of i in the descending order of Ci.

At step S2118, the security level management module 126 determines whether or not Wi exists. If Wi exists, the process goes to step S2122; otherwise, the process goes to step S2120.

Figure 22:
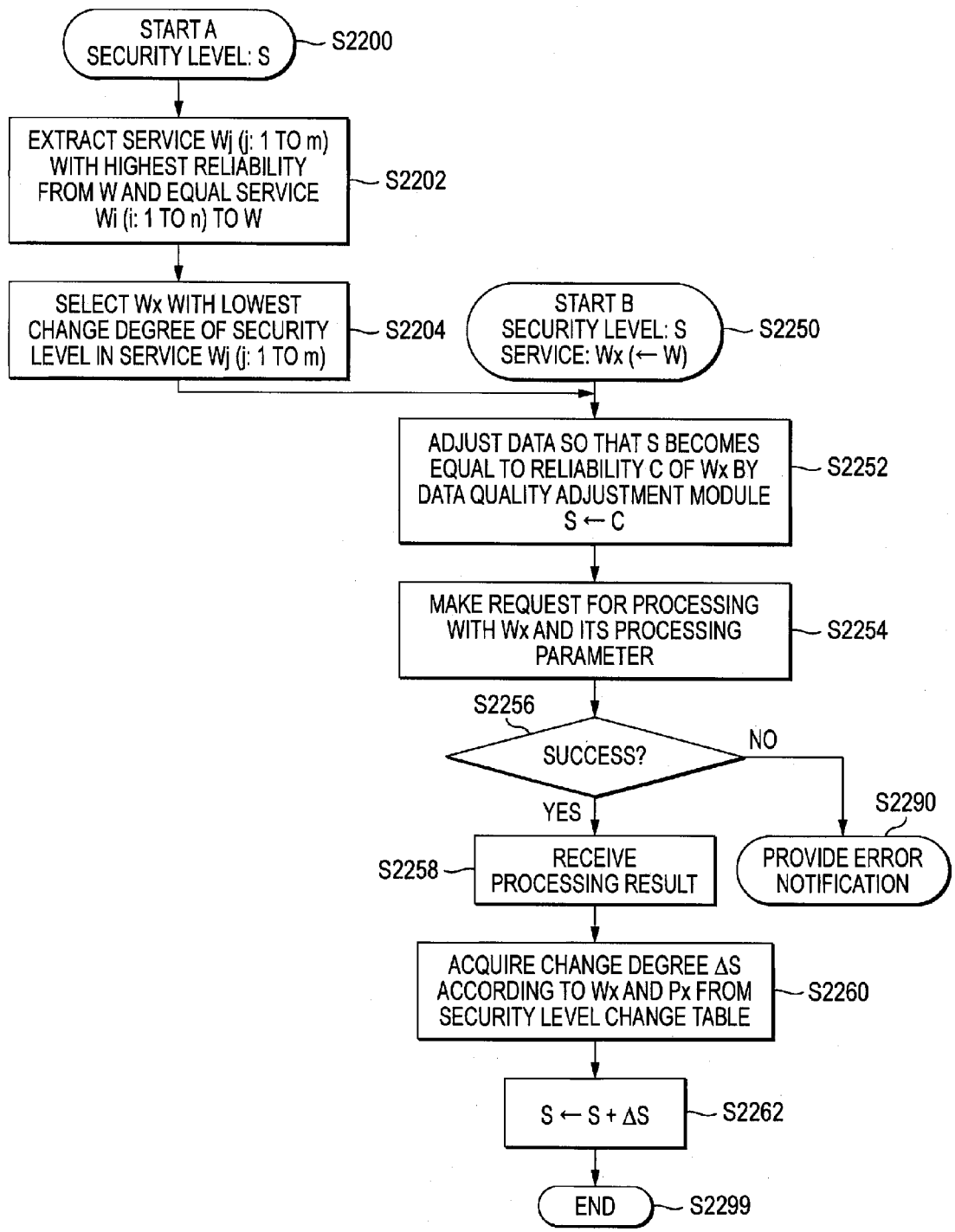
FIG. 22 is a flowchart to show adjustment processing example (1) of data quality.

At step S2120, the service cooperation module 127 starts at the position of start B (service W) of processing flow 1 at the data quality adjustment time illustrated in FIG. 22.

At step S2122, the service cooperation module 127 assigns 1 to a variable i.

At step S2124, the security level management module 126 determines whether or not Ci<S. If Ci<S, the process goes to step S2126; otherwise, the process goes to S2128.

At step S2126, the service cooperation module 127 starts processing flow 1 at the data quality adjustment time illustrated in FIG. 22 at the position of start A (service W).

At step S2128, the service cooperation module 127 transmits Pi and the processing data to W and requests W to perform processing.

At step S2130, the service cooperation module 127 determines whether or not the processing at step S2128 ends in success. If the processing ends in success, the process goes to step S2110; otherwise, the process goes to step S2132.

At step S2132, the service cooperation module 127 determines whether or not i=n. If i=n, the process goes to step S2134; otherwise, the process goes to S2136.

At step S2134, the service cooperation module 127 starts processing flow 1 at the data quality adjustment time illustrated in FIG. 22 at the position of start A (service W).

At step S2136, the service cooperation module 127 assigns i+1 to the variable i and the process returns to step S2124.

FIG. 22 is a flowchart to show adjustment processing example (1) of data quality. In this processing, two start positions (step S2200 and step S2250) exist.

Step S2200 is start A and the security level is set to S at start.

At step S2202, the security level management module 126 extracts service Wj (j: 1 to m) with the highest reliability from W and equal service Wi (i: 1 to n) to W.

At step S2204, the security level management module 126 selects Wx with the lowest change degree of the security level in service Wj (j: 1 to m) and the process goes to step S2252.

Step S2250 is start B and the security level is set to S and the service is Wx (<-W) at start.

At step S2252, the data quality adjustment module 123 adjusts processing data so that S becomes equal to the reliability C of Wx (namely, S becomes the same as or less than the value of C.)

At step S2254, the service cooperation module 127 makes a request for processing with Wx and its processing parameter.

At step S2256, the service cooperation module 127 whether or not the processing at step S2254 ends in success. If the processing ends in success, the process goes to step S2258; otherwise, error notification is provided (step S2290).

The notification is to notify the user that an error occurs through the input/output interface 121.

At step S2258, the service cooperation module 127 receives the processing result.

At step S2260, the security level management module 126 acquires change degree $\Delta S$ according to Wx and Px from the security level change table 142.

At step S2262, the security level management module 126 assigns S+$\Delta S$ to the variable S and terminates the processing (step S2299).

FIG. 23 is a flowchart to show processing example (2) of individual service. It is processing in place of adjustment processing example (1) of data quality illustrated in FIG. 222.

At step S2300, the security level is set to S, the Web service is set to W, service specification parameter is set to P, and processing is started.

At step S2302, the security level management module 126 acquires the reliability C of W from the Web service reliability table 141.

At step S2304, the security level management module 126 determines whether or not C<S. If C<S, the process goes to step S2312; otherwise, the process goes to S2306.

At step S2306, the service cooperation module 127 transmits P and processing data to W and requests W to perform processing.

At step S2308, the service cooperation module 127 determines whether or not the processing at step S2306 ends in success. If the processing ends in success, the process goes to S2310; otherwise, the process goes to step S2312.

At step S2310, the service cooperation module 127 receives the processing result and terminates the processing (step S2399).

At step S2312, the security level management module 126 acquires Wi and Pi (i: 1 to n) equal to W and P from the service compatibility table 131, acquires reliability Ci of each Wi from the Web service reliability table 141, and sorts the order of i in the descending order of Ci.

At step S2314, the security level management module 126 determines whether or not Wi exists. If Wi exists, the process goes to step S2318; otherwise, the process goes to step S2316.

Figure 24:
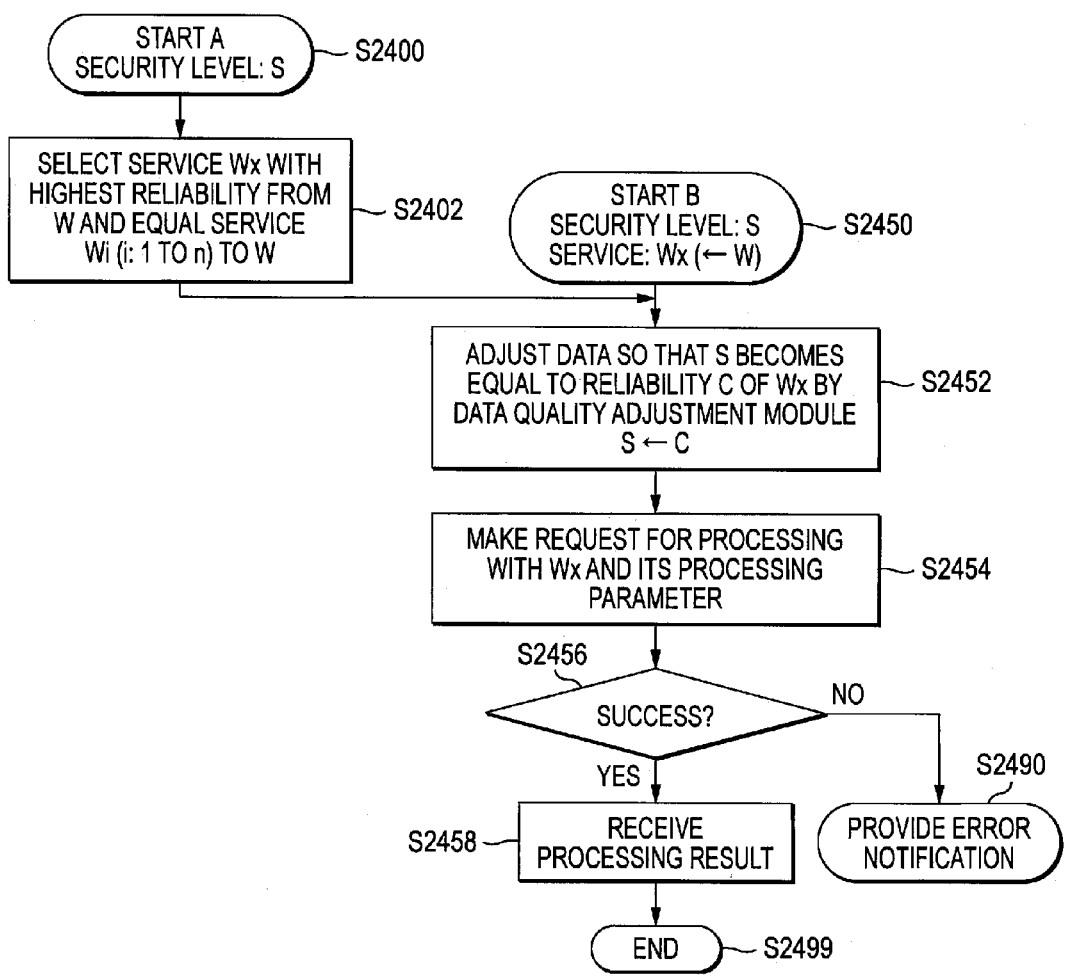
FIG. 24 is a flowchart to show adjustment processing example (2) of data quality.

At step S2316, the service cooperation module 127 starts at the position of start B (service W) of processing flow 2 at the data quality adjustment time illustrated in FIG. 24.

At step S2318, the service cooperation module 127 assigns 1 to the variable i.

At step S2320, the security level management module 126 determines whether or not Ci<S. If Ci<S, the process goes to step S2322; otherwise, the process goes to S2324.

At step S2322, the service cooperation module 127 starts at the position of start A (service W) of processing flow 2 at the data quality adjustment time illustrated in FIG. 24.

At step S2324, the service cooperation module 127 transmits Pi and the processing data to W and requests W to perform processing.

At step S2326, the service cooperation module 127 determines whether or not the processing ends in success. If the processing ends in success, the process goes to step S2310; otherwise, the process goes to step S2328.

At step S2328, the service cooperation module 127 determines whether or not i=n. If i=n, the process goes to step S2330; otherwise, the process goes to S2332.

At step S2330, the service cooperation module 127 starts at the position of start A (service W) of processing flow 2 at the data quality adjustment time illustrated in FIG. 24.

At step S2332, the service cooperation module 127 assigns i+1 to the variable i and the process returns to step S2320.

FIG. 24 is a flowchart to show adjustment processing example (2) of data quality. In this processing, two start positions (step S2400 and step S2450) exist.

Step S2400 is start A and the security level management module 126 sets the security level to S at start.

At step S2402, service Wx with the highest reliability is selected from W and equal service Wi (i: 1 to n) to W and the process goes to S2452.

Step S2450 is start B and the security level is set to S and the service is Wx (<-W) at start.

At step S2452, the data quality adjustment module 123 adjusts data so that S becomes equal to the reliability C of Wx (namely, S becomes the same as or less than the value of C.)

At step S2454, the service cooperation module 127 makes a request for processing with Wx and its processing parameter.

At step S2456, the service cooperation module 127 whether or not the processing at step S2454 ends in success. If the processing ends in success, the process goes to step S2458; otherwise, error notification is provided (step S2490). The notification is to notify the user that an error occurs through the input/output interface 121.

At step S2458, the service cooperation module 127 receives the processing result and the processing is terminated (S2499).

Figure 25:
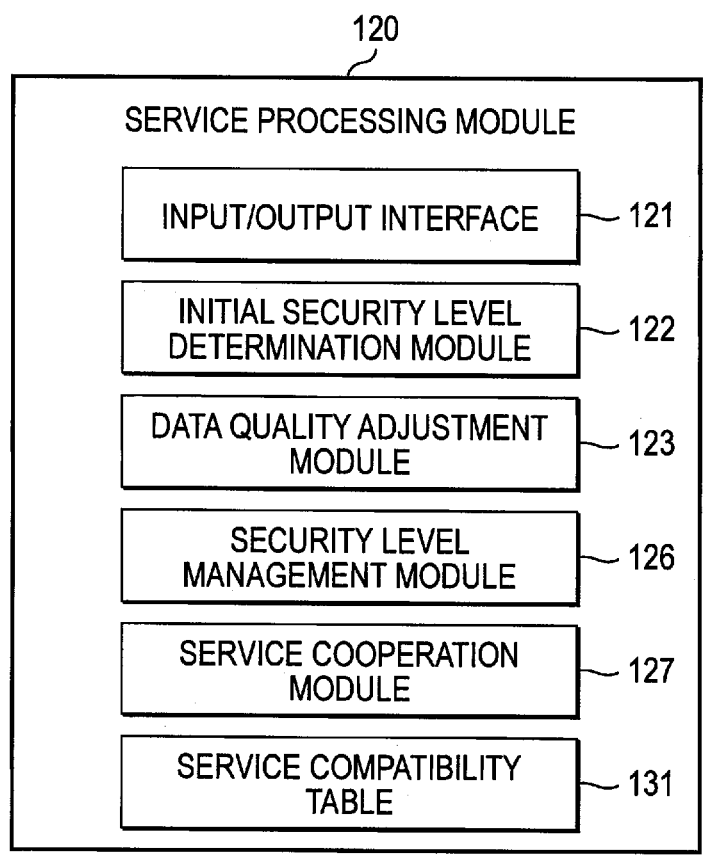
FIG. 25 is a conceptual module block diagram about a main configuration example of the second exemplary embodiment of the invention.

FIG. 25 is a conceptual module block diagram about a main configuration example of the second exemplary embodiment of the invention. A service processing module 120 in the second exemplary embodiment has an input/output interface 121, an initial security level determination module 122, a data quality adjustment module 123, a security level management module 126, a service cooperation module 127, and a service compatibility table 131.

Service cooperation information is specified from other than a service providing apparatus 100. Before cooperation processing is performed, whether or not the Web service is Web service with reliability not satisfying the security level if compatible Web service is used is determined. If the Web service does not satisfy the security level, the quality of the processing target is lowered to lower the security level of the processing target.

Figure 26:
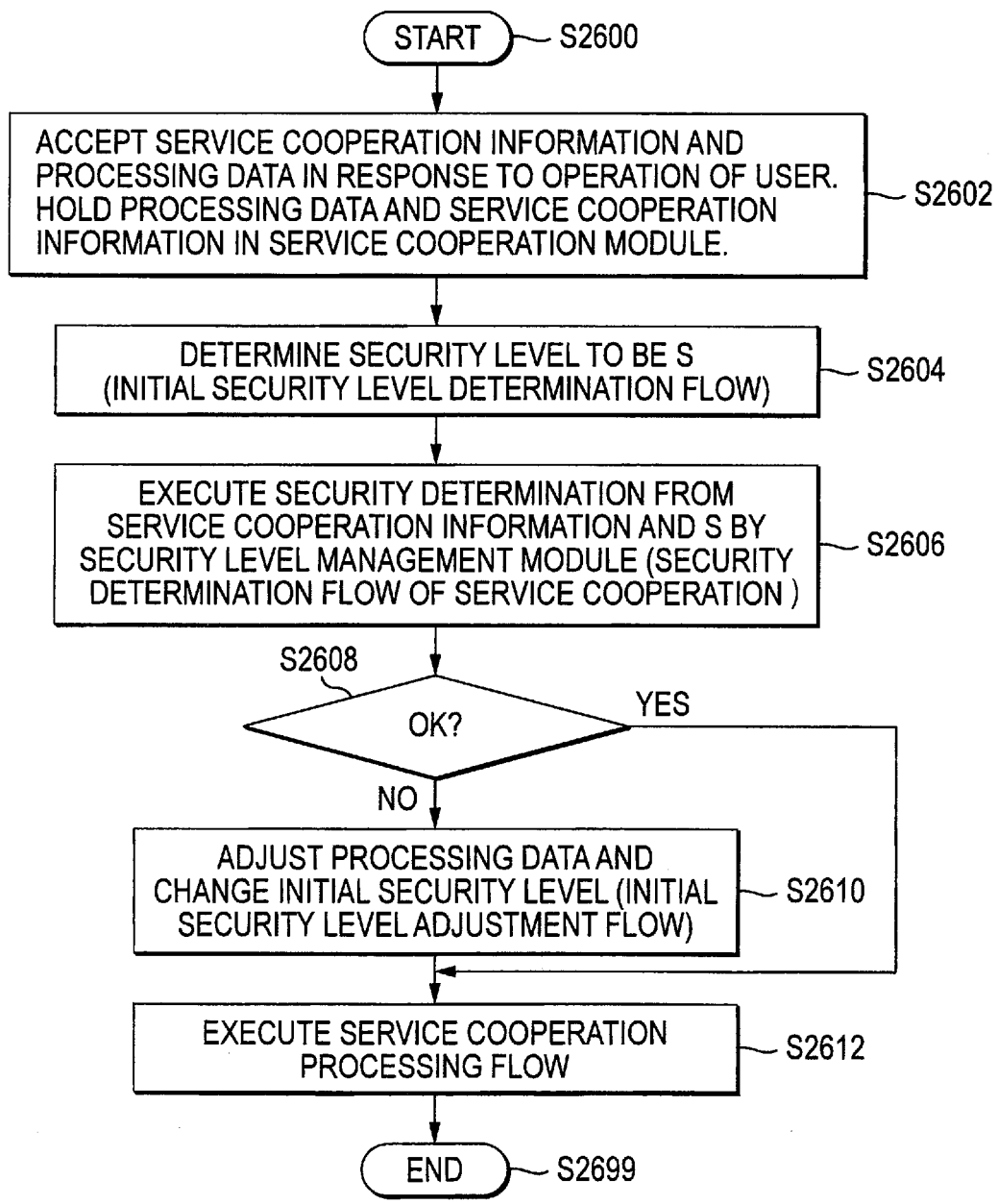
FIG. 26 is a flowchart to show a service processing example according to the second exemplary embodiment of the invention.

FIG. 26 is a flowchart to show a service processing example according to the second exemplary embodiment of the invention.

At step S2602, the service cooperation module 127 accepts service cooperation information and processing data in response to operation of the user. The processing data and the service cooperation information are held in the service cooperation module 127.

At step S2604, the initial security level determination module 122 determines the security level to be S. Any of the initial security level determination flows illustrated in FIGS. 18 to 20 is used.

Figure 27:
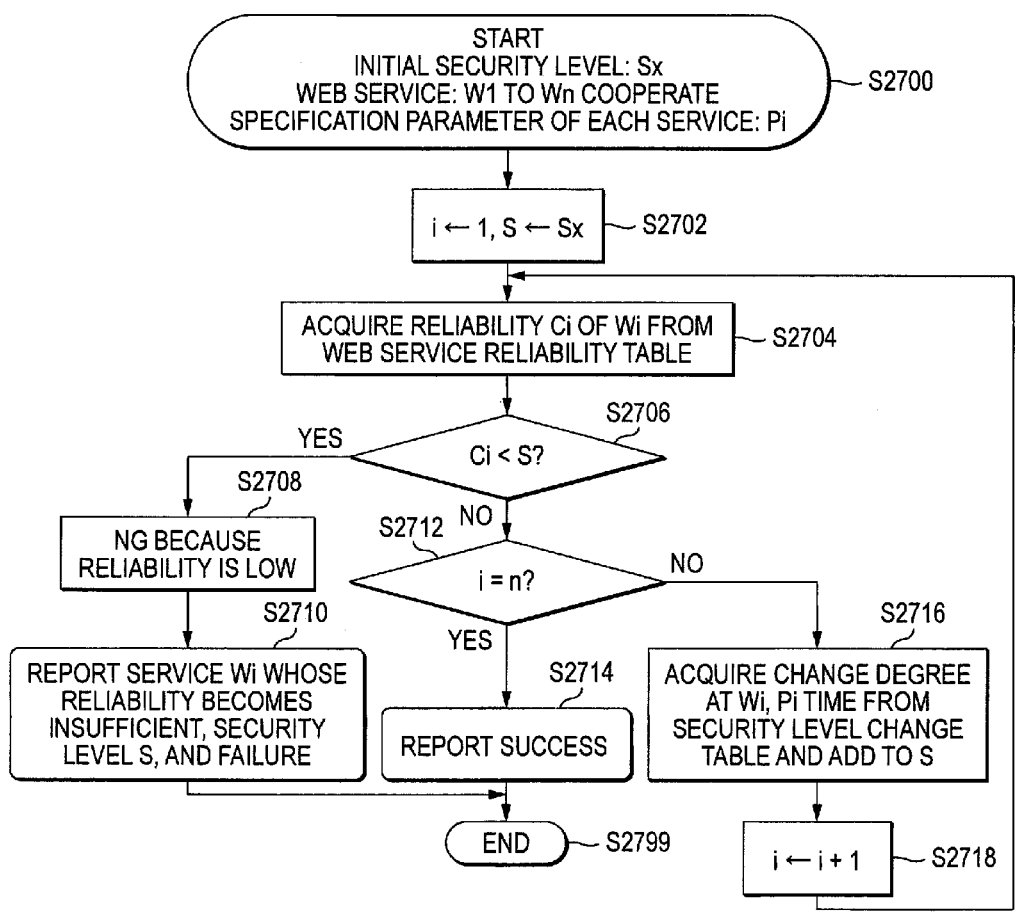
FIG. 27 is a flowchart to show a security determination processing example of service cooperation.

At step S2606, the security level management module 126 executes security determination from the service cooperation information and S. A security determination flow of service cooperation illustrated in FIG. 27 is used.

At step S2608, the security level management module 126 determines whether or not the processing result at step S2606 is OK. If the processing result is OK, the process goes to step S2612; otherwise, the process goes to step S2610.

Figure 28:
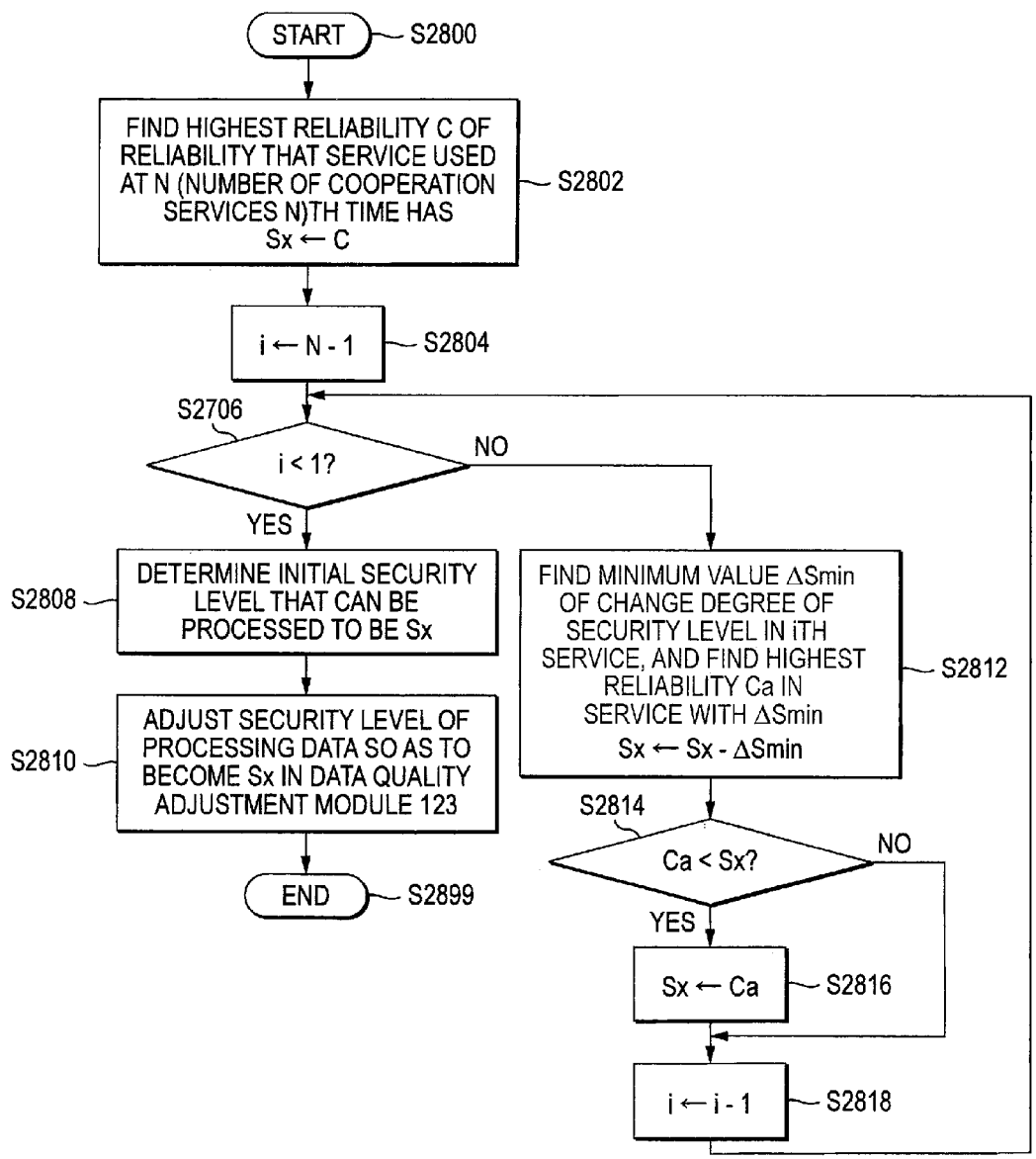
FIG. 28 is a flowchart to show an adjustment processing example of the initial security level.

At step S2610, the data quality adjustment module 123 adjusts the processing data and changes the initial security level. An initial security level adjustment flow illustrated in FIG. 28 is used.

Figure 29:
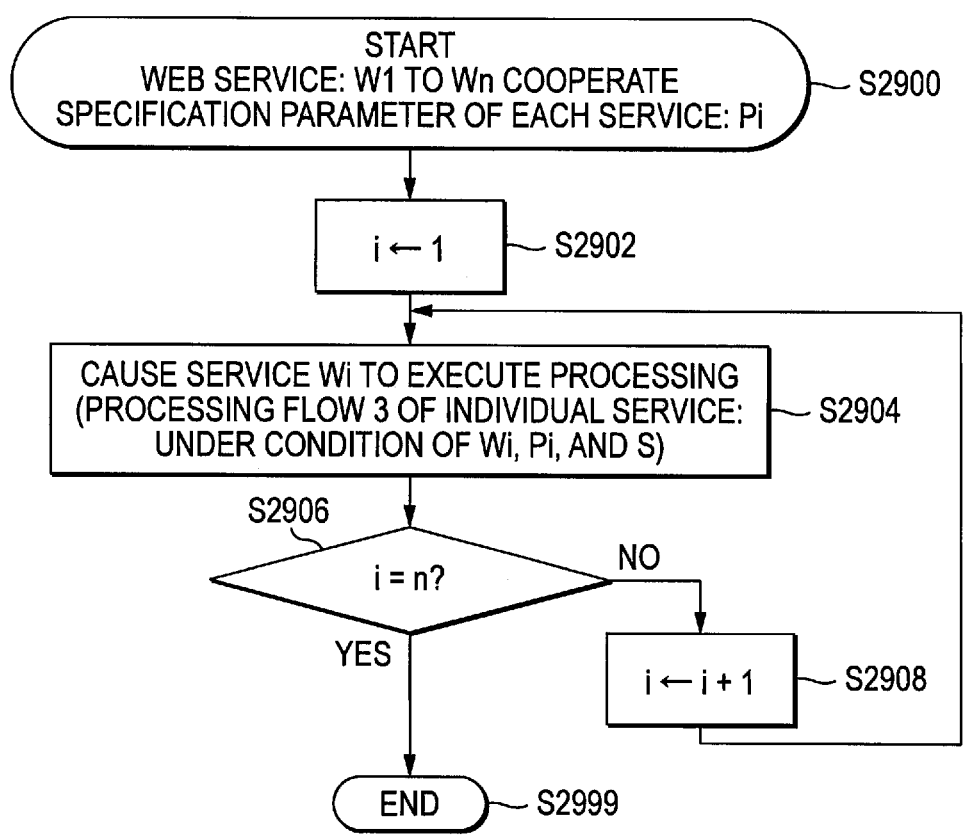
FIG. 29 is a flowchart to show a processing example of service cooperation.

At step S2612, the service cooperation module 127 executes a service cooperation processing flow illustrated in FIG. 29.

FIG. 27 is a flowchart to show a security determination processing example of service cooperation. It is a processing flow of determining whether or not service with reliability not satisfying the security level exists from previous information before processing is performed. The security level management module 126 performs the processing.

At step S2700, the initial security level is set to Sx, W1 to Wn cooperate for Web service, the specification parameter of each service is set to Pi, and the processing is started.

At step S2702, 1 is assigned to a variable i and Sx is assigned to a variable S.

At step S2704, reliability Ci of Wi is acquired from a Web service reliability table 141.

At step S2706, whether or not $Ci<S$ is determined. If $Ci<S$, the process goes to step S2708; otherwise, the process goes to step S2712.

At step S2708, NG is set because the reliability is low.

At step S2710, service Wi whose reliability becomes insufficient, security level S, and failure are reported and the processing is terminated (step S2799). After this, the determination at step S2608 in the processing flow illustrated in FIG. 26 is No and the process goes to step S2610.

At step S2712, whether or not $i=n$ is determined. If $i=n$, the process goes to S2714; otherwise, the process goes to step S716.

At step S2714, success is reported and the processing is terminated (step S2799). After this, the determination at step S2608 in the processing flow illustrated in FIG. 26 is Yes and the process goes to step S2612.

At step 2716, the change degree at the Wi, Pi time is acquired from a security level change table 142 and is added to S.

At step 2718, i+1 is assigned to the variable i and the process returns to step S2704.

FIG. 28 is a flowchart to show an adjustment processing example of the initial security level.

At step S2802, the security level management module 126 finds the highest reliability C of the reliability that the service used at the N (the number of cooperation services N)th time has. The value of the reliability C is assigned to the security level Sx.

At step S2804, the security level management module 126 assigns 1 to the variable i.

At step S2806, the security level management module 126 determines whether or not $i<1$. If $i<1$, the process goes to step S2808; otherwise, the process goes to step S2812.

At step S2808, the initial security level determination module 122 determines the initial security level that can be processed to be Sx.

At step S2810, the data quality adjustment module 123 adjusts the security level of the processing data so as to become Sx.

At step S2812, the security level management module 126 finds the minimum value $\Delta Smin$ of the change degree of the security level among the change degrees of the security levels corresponding to the i-th service, and finds the highest reliability Ca in service with minimum value $\Delta Smin$. The value of $Sx-\Delta Smin$ is assigned to the security level Sx.

At step S2814, the security level management module 126 determines whether or not $Ca<Sx$. If $Ca<Sx$, the process goes to step S2816; otherwise, the process goes to step S2818.

At step S2816, the security level management module 126 assigns Ca to the variable Sx and the process goes to step S2818.

At step S2818, the security level management module 126 assigns i−1 to the variable i and returns to step S2806.

FIG. 29 is a flowchart to show a processing example of service cooperation. The service cooperation module 127 performs processing.

At step S2900, Web services W1 to Wn are caused to cooperate, the specification parameter of each service is set to Pi, and the processing is started.

At step S2902, 1 is assigned to the variable i.

Figure 30:
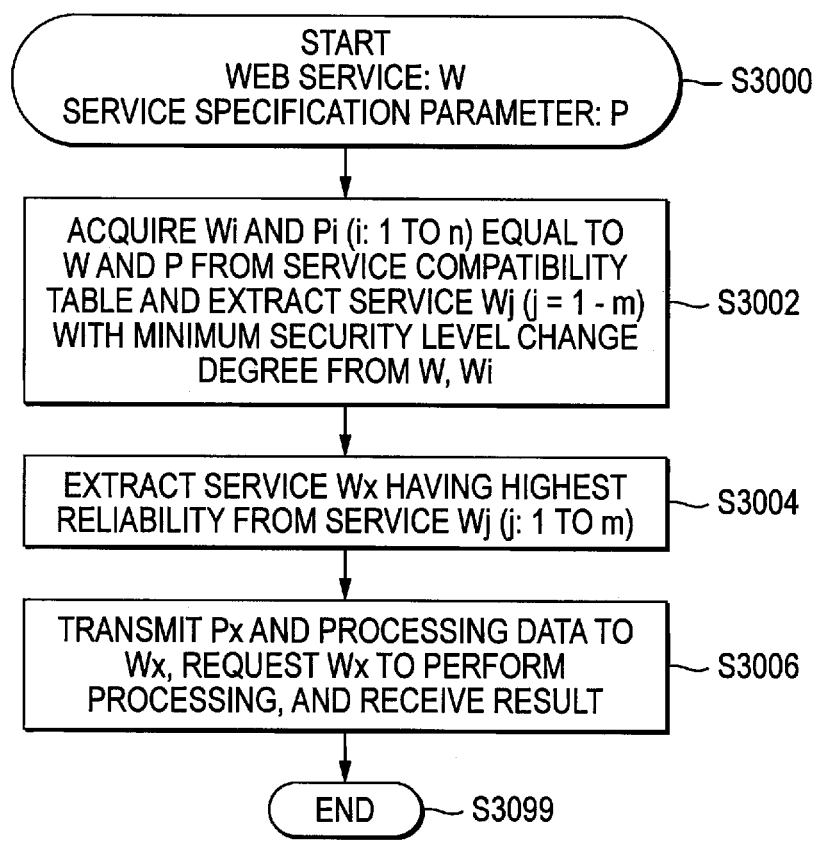
FIG. 30 is a flowchart to show processing example (3) of individual service.

At step S2904, the service Wi is caused to execute the processing. Processing flow 3 of individual service illustrated in FIG. 30 is used. Processing flow 3 is used under conditions of Wi, Pi, S.

At step S2906, whether or not $i=n$ is determined. If $i=n$, the processing is terminated (step S2999); otherwise, the process goes to step S2908.

At step S2908, i+1 is assigned to the variable i and the process returns to step S2904.

FIG. 30 is a flowchart to show processing example (3) of individual service. The progression of the security level accompanying the progress of cooperation processing has been already checked before the stage arriving at the processing and thus check for each processing is not required.

At step S3000, the Web service is set to W, service specification parameter is set to P, and processing is started.

At step S3002, the security level management module 126 acquires Wi and Pi (i: 1 to n) equal to W and P from the service compatibility table 131 and extracts service Wj (j=1–m) with the minimum security level change degree from W, Wi.

At step S3004, the security level management module 126 extracts service Wx having the highest reliability from service Wj (j: 1 to m).

At step S3006, the service cooperation module 127 transmits Px and processing data to Wx, requests Wx to perform processing, and receives the result, and the processing is terminated (step S3099).

Figure 31:
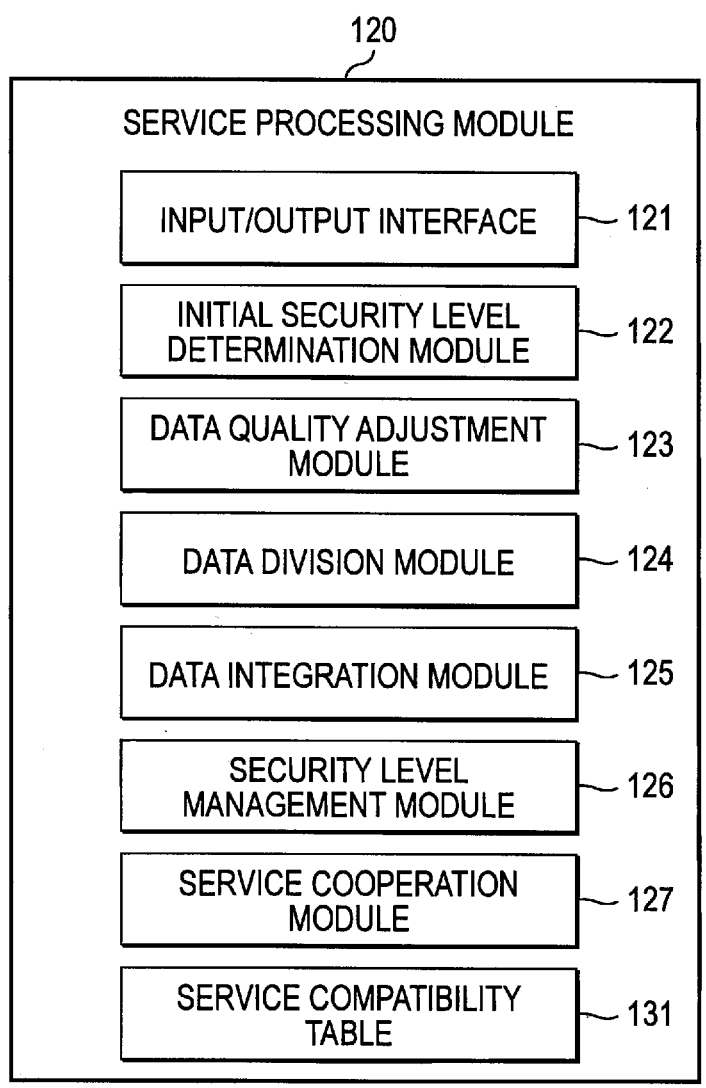
FIG. 31 is a conceptual module block diagram about main configuration examples of third and fourth exemplary embodiments of the invention.

FIG. 31 is a conceptual module block diagram about main configuration examples of the third and fourth exemplary embodiments of the invention. A service processing module 120 in the third exemplary embodiment, the fourth exemplary embodiment has an input/output interface 121, an initial security level determination module 122, a data quality adjustment module 123, a data division module 124, a data integration module 125, a security level management module 126, a service cooperation module 127, and a service compatibility table 131. The data division module 124 and the data integration module 125 are added to the first exemplary embodiment or the second exemplary embodiment.

The third exemplary embodiment is provided by adding division processing of the processing target to the first exemplary embodiment. The fourth exemplary embodiment is provided by adding division processing of the processing target to the second exemplary embodiment.

Figure 32:
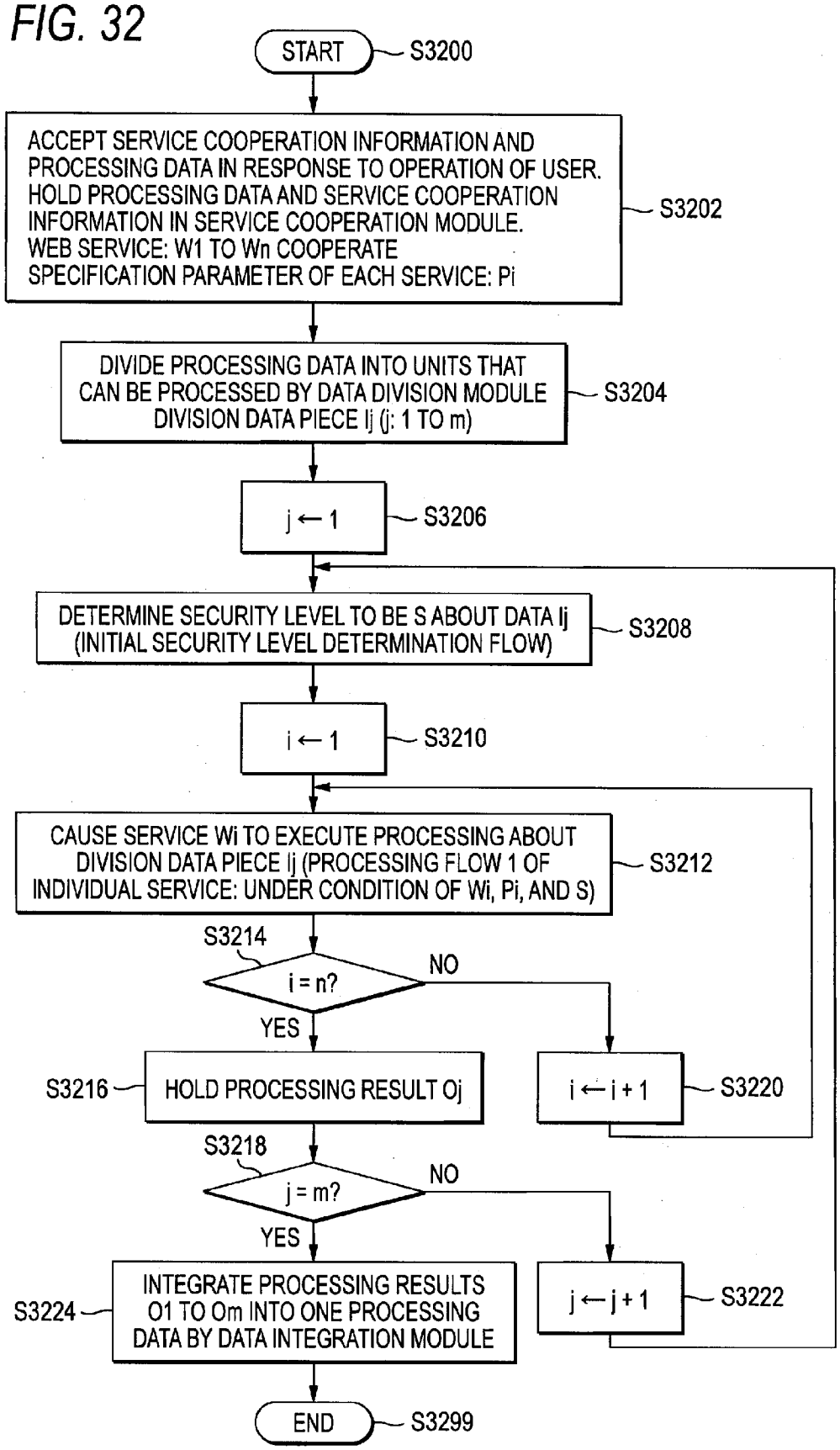
FIG. 32 is a flowchart to show a service processing example according to the third exemplary embodiment of the invention.

FIG. 32 is a flowchart to show a service processing example according to the third exemplary embodiment of the invention. In the processing, first, processing data is divided into pieces, while actual processing is performed for each division data piece, if service of reliability satisfying the security level does not exist, the security level is lowered by the data quality adjustment module 123 and the division data pieces after processed are last integrated to provide the processing result.

At step S3202, the service cooperation module 127 accepts service cooperation information and processing data in response to operation of the user. The processing data and the service cooperation information are held in the service cooperation module 127. Web services W1 to Wn are caused to cooperate and the specification parameter of each service is set to Pi.

At step S3204, the data division module 124 divides the processing data into units that can be processed. The division data piece is set to Ij (j: 1 to m).

At step S3206, the service cooperation module 127 assigns 1 to a variable j.

At step S3208, the initial security level determination module 122 determines the security level to be S about the data Ij. Any of the initial security level determination flows illustrated in FIGS. 18 to 20 is used.

At step S3210, the service cooperation module 127 assigns 1 to a variable i.

At step S3212, the service cooperation module 127 causes the service Wi to execute processing about the division data piece Ij. Processing flow 1 of individual service illustrated in FIG. 21 is used. Processing flow 1 is used under the conditions of Wi, Pi, and S.

In a system in which the security level does not vary for each processing according to each Web service, at step S3312, processing flow 2 of individual service illustrated in FIG. 23 is used in place of processing flow 1 of individual service.

At step S3214, the service cooperation module 127 determines whether or not i=n. If i=n, the process goes to step S3216; otherwise, the process goes to step S3220.

At step S3216, the service cooperation module 127 holds processing result Oj at step S3212.

At step S3218, the service cooperation module 127 determines whether or not j=m. If j=m, the process goes to step S3224; otherwise, the process goes to step S3222.

At step S3220, the service cooperation module 127 assigns i+1 to the variable i and returns to step S3212.

At step S3222, the service cooperation module 127 assigns j+1 to the variable j and returns to step S3208.

At step S3224, the data integration module 125 integrates the processing results O1 to Om into one processing data.

Figure 33:
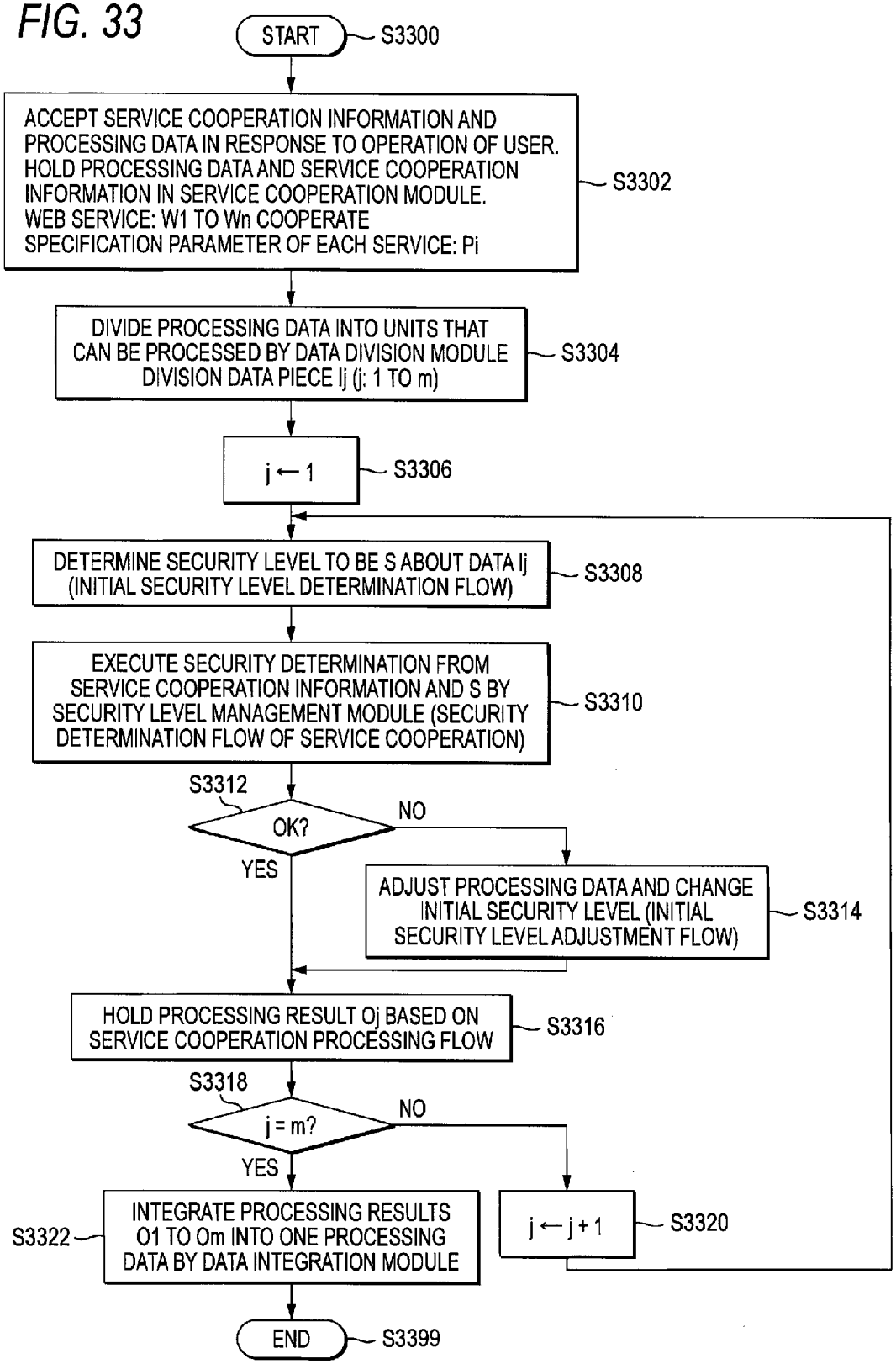
FIG. 33 is a flowchart to show a service processing example according to the fourth exemplary embodiment of the invention.

FIG. 33 is a flowchart to show a service processing example according to the fourth exemplary embodiment of the invention. In the processing, first, processing data is divided into pieces and whether or not Web service not satisfying the security level exists if cooperation processing is performed about each division data piece before cooperation processing is performed. If Web service not satisfying the security level exists, the security level of division data is lowered by the data quality adjustment module 123 and the division data pieces after processed are last integrated to provide the processing result.

At step S3302, the service cooperation module 127 accepts service cooperation information and processing data in response to operation of the user. The processing data and the service cooperation information are held in the service cooperation module 127. Web services W1 to Wn are caused to cooperate and the specification parameter of each service is set to Pi.

At step S3304, the data division module 124 divides the processing data into units that can be processed. The division data piece is set to Ij (j: 1 to m).

At step S3306, the service cooperation module 127 assigns 1 to a variable j.

At step S3308, the initial security level determination module 122 determines the security level to be S about the data Ij. Any of the initial security level determination flows illustrated in FIGS. 18 to 20 is used.

At step S3310, the security level management module 126 executes security determination from the service cooperation information and S. The security determination flow of service cooperation illustrated in FIG. 27 is used.

At step S3312, the service cooperation module 127 determines whether or not the processing result at step S3310 is OK is determined. If the processing result is OK, the process goes to step S3316; otherwise, the process goes to S3314.

At step S3314, the data quality adjustment module 123 adjusts the processing data and changes the initial security level. The initial security level adjustment flow illustrated in FIG. 28 is used.

At step S3316, the service cooperation module 127 holds processing result Oj based on the service cooperation processing flow.

At step S3318, the service cooperation module 127 determines whether or not j=m. If j=m, the process goes to step S3322; otherwise, the process goes to step S3320.

At step S3320, the service cooperation module 127 assigns j+1 to the variable j and returns to step S3308.

At step S3222, the data integration module 125 integrates the processing results O1 to Om into one processing data.

A hardware configuration example of the image processing apparatus of the exemplary embodiment will be discussed with reference to FIG. 34. The configuration shown in FIG. 34 includes a personal computer (PC), etc., for example. A hardware configuration example including a data read section 3417 such as a scanner and a data output section 3418 such as a printer is shown.

A CPU (Central Processing Unit) 3401 is a control section for executing processing conforming to computer programs describing execution sequences of various modules described above in the exemplary embodiments, namely, the initial security level determination module 122, the data quality adjustment module 123, the data division module 124, the data integration module 125, the security level management module 126, the service cooperation module 127, etc.

ROM (Read-Only Memory) 3402 stores programs, operation parameters, etc., used by the CPU 3401. RAM (Random Access Memory) 3403 stores programs used in execution of the CPU 3401, parameters changing appropriately in the execution of the CPU 3401, and the like. They are connected by a host bus 3404 implemented as a CPU bus, etc.

The host bus 3404 is connected to an external bus 3406 such as a PCI (Peripheral Component Interconnect/Interface) bus through a bridge 3405.

A keyboard 3408 and a pointing device 3409 such as a mouse are input devices operated by the user. A display 3410 is a liquid crystal display, a CRT (Cathode Ray Tube), or the like for displaying various pieces of information as text and image information.

An HDD (Hard Disk Drive) 3411 contains a hard disk and drives the hard disk for recording or playing back a program and information executed by the CPU 3401. The hard disk stores a document of the processing target, a document of the processing result of the data quality adjustment module 123, etc., the service compatibility table 131, the service menu correspondence table 132, the Web service reliability table 141, the security level change table 142, etc. Further, the hard disk stores various computer programs such as other various data processing programs.

A drive 3412 reads data or a program recorded on a mounted removable record medium 3413 such as a magnetic disk, an optical disk, a magneto-optical disk, or semiconductor memory, and supplies the data or the program to the RAM 3403 connected through an interface 3407, the external bus 3406, the bridge 3405, and the host bus 3404. The removable record medium 3413 can also be used as a data record area like a hard disk.

A connection port 3414 is a port for connecting an external connection device 3415 and has a connection section of a USB, IEEE 1394, etc. The connection port 3414 is connected to the CPU 3401, etc., through the interface 3407, the external bus 3406, the bridge 3405, the host bus 3404, etc. A communication section 3416 is connected to a network for executing data communication processing with an external system. A data read section 3417 is, for example, a scanner and executes document read processing. A data output section 3418 is, for example, a printer and executes document data output processing.

Figure 34:
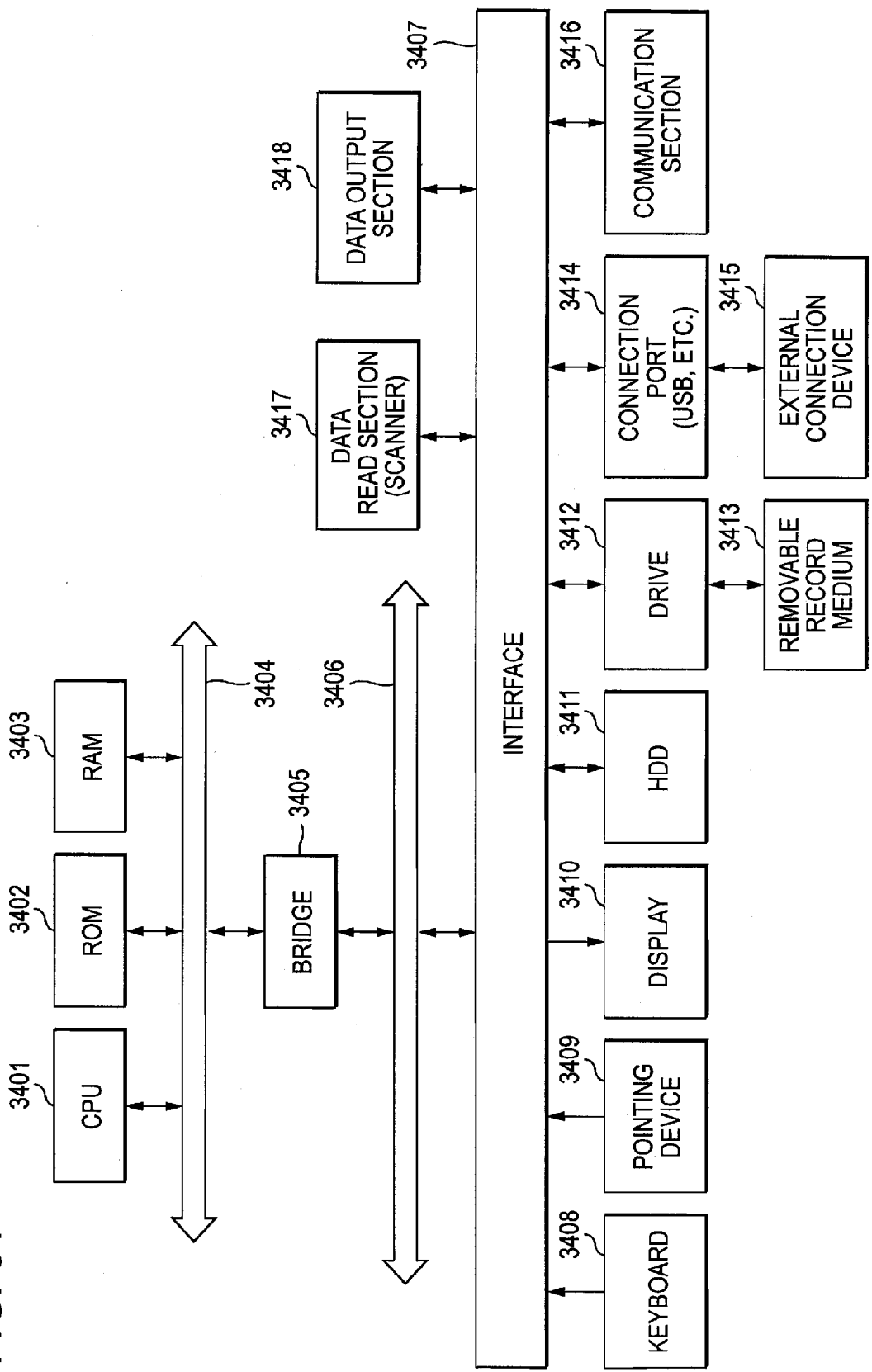
FIG. 34 is a block diagram to show a hardware configuration example of a computer for realizing the exemplary embodiments.

The hardware configuration of the image processing apparatus shown in FIG. 34 shows one configuration example and the configuration of each of the exemplary embodiments is not limited to the configuration shown in FIG. 34 and may be a configuration that can execute the modules described in the exemplary embodiments. For example, some modules may be implemented as dedicated hardware (for example, Application-Specific Integrated Circuit (ASIC), etc.), some modules may exist in an external system and may be connected through a communication line, and further a plurality of systems shown in FIG. 34 may be connected by a communication line and may cooperate with each other. The system may be built in a copier, a fax, a scanner, a printer, a multiple function apparatus (an image processing apparatus having the functions of any two or more of a scanner, a printer, a copier, a fax, etc.,) or the like.

The various exemplary embodiments described above may be combined (for example, a module in one exemplary embodiment is applied to another exemplary embodiment, a module in one exemplary embodiment is replaced with another module in another exemplary embodiment, etc.,). Particularly, to deal with the case where Web service is added during processing, the case where the reliability is changed during processing, etc., the first and second exemplary embodiments may be combined. The arts described in Background Arts may be adopted as the processing substance of each module.

In the description of the exemplary embodiments, in comparison with a predetermined value, "equal to or more than," "equal to or less than," "more than," and "less than" may be "more than," "less than," "equal to or more than," and "equal to or less than" respectively unless a contradiction occurs in the combination.

The described program may be provided as it is stored on a record medium or the program may be provided by communication means. In this case, for example, the described program may be grasped as the invention of a computer-readable record medium recording a program."

The expression "computer-readable record medium recording a program" is used to mean a record medium that can be read by a computer where a program is recorded, used to install and execute the program, to distribute the program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), Blue-ray Disc (registered trademark), magneto-optical disk (MO), flexible disk (FD), magnetic tape, hard disk, read-only memory (ROM), electrically erasable and programmable read-only memory (EEPROM), flash memory, random access memory (RAM), etc., for example.

The above-described program or a part thereof may be recorded in any of the above-described record media for retention, distribution, etc. The above-described program or a part thereof may be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and may be carried over a carrier wave.

Further, the above-described program may be a part of another program or may be recorded in a record medium together with a different program. It may be recorded as it is divided into a plurality of record media. It may be recorded in any mode if it can be restored, such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor which executes:
a reliability determination unit that determines reliability required for processing a processing target based on at least one parameter of the processing target which identifies a reliability value of the processing target;
a processing determination unit that makes a comparison between the reliability value determined by the reliability determination unit and a reliability value of a processing main body and determines whether or not the processing main body can be caused to process the processing target;
a processing target change unit that changes the processing target so as to change the reliability value of the processing target utilizing a division unit that divides the processing target into portions in response to the processing determination unit determining that the processing main body cannot be caused to process the processing target;
a processing request unit that requests the processing main body to process the processing target changed by the processing target change unit,
wherein when a plurality of processing main bodies perform a sequence of processing, before each of the processing main bodies performs processing, the processing determination unit determines whether or not the processing main body can be caused to process the processing target,
wherein the reliability determination unit, the processing determination unit, the processing target change unit, and processing request unit process the divided portions provided by the division unit as processing targets,
wherein dividing the processing target into portions comprises lowering the reliability value of the processing target to match the reliability value of the processing main body, and each divided portion of the processing target provided by the division unit has a reliability value that is lower than the reliability value of the processing target, and
wherein the reliability value is a required security level for processing the processing target based on the at least one parameter of the processing target.

2. The information processing apparatus according to claim 1, wherein lowering the reliability value of the processing target further comprises lowering a quality of the processing target.

3. The information processing apparatus according to claim 2, wherein the lowering the quality of the processing target comprises degrading the quality of the processing target by reducing a resolution of the processing target.

4. An information processing method comprising:
determining reliability required for processing a processing target based on at least one parameter of the processing target which identifies a reliability value of the processing target;
making a comparison between the determined reliability value of the processing target and a reliability value of a processing main body and determining whether or not the processing main body can be caused to process the processing target;
changing the processing target so as to change the reliability value of the processing target by dividing the processing target into portions in response to the determination indicating that the processing main body cannot be caused to process the processing target; and
requesting the processing main body to process the changed processing target; and
processing the divided portions provided by the dividing as processing targets,
wherein when a plurality of processing main bodies perform a sequence of processing, before each of the processing main bodies performs processing, performing the determining whether or not the processing main body can be caused to process the processing target, and
wherein diving the processing target into portions comprises lowering the reliability value of the processing target to match the reliability value of the processing main body, and each divided portion of the processing target provided by the dividing has a reliability value that is lower than the reliability value of the processing target, and
wherein the reliability value is a required security level for processing the processing target based on the at least one parameter of the processing target.

5. A non-transitory computer readable medium storing a program causing a computer to execute a process for information processing, the process comprising:
determining reliability required for processing a processing target based on at least one parameter of the processing target which identifies a reliability value of the processing target;
making a comparison between the determined reliability value of the processing target and a reliability value of a processing main body and determining whether or not the processing main body can be caused to process the processing target;
changing the processing target so as to change the reliability value of the processing target by dividing the processing target into portions in response to the determination indicating that the processing main body cannot be caused to process the processing target;
requesting the processing main body to process the changed processing target; and
processing the divided portions provided by the dividing as processing targets,
wherein when a plurality of processing main bodies perform a sequence of processing, before each of the processing main bodies performs processing, performing the determining whether or not the processing main body can be caused to process the processing target, and
wherein dividing the processing target into portions comprises lowering the reliability value of the processing target to match the reliability value of the processing main body, and each divided portion of the processing target provided by the dividing has a reliability value that is lower than the reliability value of the processing target, and
wherein the reliability value is a required security level for processing the processing target based on the at least one parameter of the processing target.

* * * * *